(12) United States Patent
Sakamoto et al.

(10) Patent No.: US 6,790,329 B2
(45) Date of Patent: Sep. 14, 2004

(54) METHOD OF FORMING COATING FILMS AND COATED ARTICLE

(75) Inventors: Hiroyuki Sakamoto, Kobe (JP); Noriyuki Tsuboniwa, Nagaokakyo (JP); Motoki Fujii, Osaka (JP); Kazuo Morichika, Takatsuki (JP); Ichiro Kawakami, Takatsuki (JP)

(73) Assignee: Nippon Paint Co., Ltd., Osaka (JP)

( * ) Notice: Subject to any disclaimer, the term of this patent is extended or adjusted under 35 U.S.C. 154(b) by 96 days.

(21) Appl. No.: 09/992,011

(22) Filed: Nov. 26, 2001

(65) Prior Publication Data

US 2002/0098363 A1 Jul. 25, 2002

(30) Foreign Application Priority Data

Nov. 27, 2000 (JP) ........................................ 2000-358900

(51) Int. Cl.⁷ ............................................... C25D 13/06
(52) U.S. Cl. ...................... 204/488; 204/499; 204/504; 204/507
(58) Field of Search ................................ 204/488, 489, 204/499, 504, 507

(56) References Cited

FOREIGN PATENT DOCUMENTS

EP 0854207 A1 * 7/1998

* cited by examiner

*Primary Examiner*—Kishor Mayekar
(74) *Attorney, Agent, or Firm*—Sughrue Mion, PLLC

(57) ABSTRACT

It is an object of the present invention to provide a method of forming a coating film by which a coating film excellent in weathering resistance, light degradation resistance, smoothness and the like can be formed on the outer panel portion of an article to be coated such as a car, and a coating film excellent in rust prevention can be formed on the inner panel portion (bag-structured portion) of the article to be coated, with the interface between the outer and inner panel portions of the article being excellent in rust prevention and finish as well, and by which resources saving and coating cost reduction can be expected.

19 Claims, 2 Drawing Sheets

METHOD OF FORMING COATING FILMS AND COATED ARTICLE

TECHNICAL FIELD

The present invention relates to a method of forming a coating film which can suitably be applied to articles to be coated having a complicated shape such as car bodies, and, more particularly, to a method of forming a coating film which comprises applying an electrodeposition coating [1] and then applying an electrodeposition coating [2], followed by baking and which enables application of a top coating without applying an intermediate coating, and to a coated article having the coating film obtained thereby.

BACKGROUND ART

The coating step of car bodies and the like is generally carried out by the so-called three-coat three-bake technique, namely by carrying out undercoating using a cationic electrodeposition coating, curing by baking, applying an intermediate coating, baking the intermediate coating film and, further, applying a base coating and a clear coating as a top coating and curing both coating films simultaneously.

Of these steps, the cationic electrodeposition coating employed as a means of undercoating is carried out mainly for the purpose of inhibiting corrosion and, therefore, even in the case of articles having a complicated structure, such as car bodies, it is necessary that all parts, in particular the inner panel site having a bag-like structure, be secured for sufficient corrosion inhibition. However, if an increased voltage is applied to form a sufficiently thick coating film until the inner panel site having a bag-like structure, the coating film on the outer panel portion will become excessive, whereby the coating amount will be unnecessarily increased and the finish appearance will be rather deteriorated. To avoid this problem, a sufficient degree of throwing power is to be secured. In this specification, throwing power means the successive formation of a coat on uncoated portion of the article to be coated.

A cationic electrodeposition coating excellent in throwing power, which comprises an ethynyl or nitrile group- or a like triple bond-containing fundamental resin within a molecule, is disclosed in WO 98/03701, for instance. In Japanese Kokai Publication 2000-38527, there is disclosed a cationic electrodeposition coating excellent in throwing power and shock resistance of coating films, which comprises an epoxy resin skeleton and has a sulfonium group, an aliphatic hydrocarbon group of 8 to 24 carbon atoms, which may optionally contain an unsaturated double bond within the chain thereof, and a propargyl group.

On the other hand, an intermediate coating generally occurs as a solution type coating and is applied by spraying. Since a good coating film appearance is required, the viscosity of the intermediate coating is strictly adjusted and, further, the spray coating must be carried out in an intermediate coating booth in which air conditioning, temperature adjustment and the like are made under highly controlled conditions. Thus, much cost and labor are required for the control.

So long as these undercoat coating film and intermediate coating film are concerned, the intermediate coating film is further required to have good weathering resistance, light degradation resistance, smoothness and so forth, while the undercoat coating film is required to have high corrosion prevention and rust prevention even at the bag-like structure portions. At the same time, resources saving and coating cost reduction are required from the environmental protection viewpoint.

In Japanese Kokai Publication Hei-09-125286, there is disclosed a coating method which comprises applying a thermosetting epoxy polyester resin-based powder coating to an article to be coated, carrying out baking to form an uncured coating film, then applying a thermosetting polyester-modified epoxy resin-based cationic electrodeposition coating to the portions not yet coated with the powder coating and curing the powder coating film and electrodeposited coating film simultaneously. This method, which comprises using the thermosetting epoxy polyester resin-based powder coating in lieu of the ordinary intermediate coating and then applying a thermosetting polyester-modified epoxy resin-based cationic electrodeposition coating to portions not yet coated with the powder coating such as the bag-like structure portions of the article to be coated, still requires the use of an intermediate coating booth, hence is not satisfactory from the coating cost reduction viewpoint. Furthermore, the vicinity of the interface between the outer panel site and bag-structured site of the article to be coated is coated in such a state that the thermosetting epoxy polyester resin-based powder coating is scattered, so that the film itself does not form a continuous layer. Thus, there arises the problem that even after the subsequent application of the thermosetting polyester-modified epoxy resin-based cationic electrodeposition coating, the rust prevention and finish are poor in the vicinity of the interface.

In Japanese Kokai Publication Hei-08-120494, there is disclosed a coating method which comprises applying a cationic electrodeposition coating mainly comprising a hydroxyl group-containing cationically electrodepositable vinyl copolymer, curing by heating, then applying a cationic electrodeposition coating mainly comprising a cationically electrodepositable epoxy resin, curing by heating and applying a water-borne base coating and a top coating. In Japanese Kokai Publication Hei-10-8291, there is disclosed a coating method which comprises applying a cationic electrodeposition coating capable of forming a coating film excellent in chipping resistance, preheating those portions having a film thickness less than the intended film thickness at 40 to 80° C. and those portions having the intended film thickness at a temperature higher by 20 to 70° C. as compared with those portions having a film thickness less than the intended film thickness and then applying a cationic electrodeposition coating mainly comprising an epoxy resin to thereby form a coating film on those portions having a film thickness less than the intended film thickness.

According to these methods, the ordinary coating step of an intermediate coating is omitted by applying two kinds of cationic electrodeposition coatings and the throwing power relative to the bag-structured portions is improved by heating for curing or preheating following application of the first stage cationic electrodeposition coating and thus preventing the second stage cationic electrodeposition coating film from depositing on the outer panel portions. However, in heating for curing or preheating following application of the first stage cationic electrodeposition coating, the temperature control is complicated, so that these methods are not satisfactory from the viewpoint of resources saving and/or coating cost reduction. Furthermore, in the vicinity of the interface between the outer panel site and the bag-structured site of the article to be coated, the coating film formed by applying the first stage cationic electrodeposition coating is very thin or the film itself occurs as a discontinuous layer, so that even after application of the second stage cationic electrodeposition coating, there remains the problem that the rust prevention of the vicinity of the interface is poor.

In view of the above-mentioned state of the art, it is an object of the present invention to provide a method of forming a coating film by which a coating film excellent in weathering resistance, light degradation resistance, smoothness and the like can be formed on the outer panel portion of an article to be coated such as a car, and a coating film excellent in rust prevention can be formed on the inner panel portion (bag-structured portion) of the article to be coated, with the interface between the outer and inner panel portions of the article being excellent in rust prevention and finish as well, and by which resources saving and coating cost reduction can be expected.

SUMMARY OF THE INVENTION

The present inventors found (1) that when a coating capable of providing performance characteristics required for the intermediate coating in the conventional use, namely weathering resistance, light degradation resistance, smoothness, chipping resistance, rust prevention (dry-wet method) and adhesiveness to materials and so forth, is used as a cationic electrodeposition coating in the first stage, the step of intermediate coating, followed by baking thereof, which is generally carried out, can be omitted and, thus, the process cost required for air conditioning, temperature adjustment and like controls can be reduced and the resources saving and coating cost reduction can be attained because of the reduction of the film thickness of the outer panel portion;

(2) that when an electrodeposition coating having a digital electrodepositability is used as the first stage cationic electrodeposition coating, the rust prevention and finish become good in the interface between the outer panel portion and the inner panel portion (bag-structured portion) of the article to be coated;

(3) that when a sulfonium group-containing resin is used in the first stage cationic electrodeposition coating, the step of heating for curing and the step of preheating between the first stage cationic electrodeposition coating and second stage cationic electrodeposition coating can be omitted; and (4) that when an electrodeposition coating having high throwing power is used as the second stage cationic electrodeposition coating, a high level of corrosion prevention and rust prevention can be secured even in the inner panel portion (bag-structured portion) of the article to be coated and, further, only the inner panel portion (bag-structured portion) of the article to be coated is coated with the second stage cationic electrodeposition coating, so that the throwing power can be further improved. Based on these findings, the present invention has now been completed.

Thus, the present invention is related to a method of forming a coating film which comprises applying an electrodeposition coating [1] to an article to be coated and applying an electrodeposition coating [2] thereon, followed by baking, said electrodeposition coating [1] containing a sulfonium group-containing resin and giving a film thickness to a face B of not more than one tenth of the film thickness of a face A when used in the electrodeposition coating of a coating with a resin solid matter of 20% by weight by a four sheet box method at 100 V and 40° C. for 120 seconds following a rise time of 5 seconds to provide the face A with a 20 to 30 μm film thickness and said electrodeposition coating [2] having a time point at which the electric resistance value per unit volume of a deposited coat increases in the process of electrodeposition under a constant current condition.

The present invention is also directed to a coated article having the coating film formed by said method of forming a coating film.

EXPLANATION OF THE NUMERICAL SYMBOLS

Figure 1:
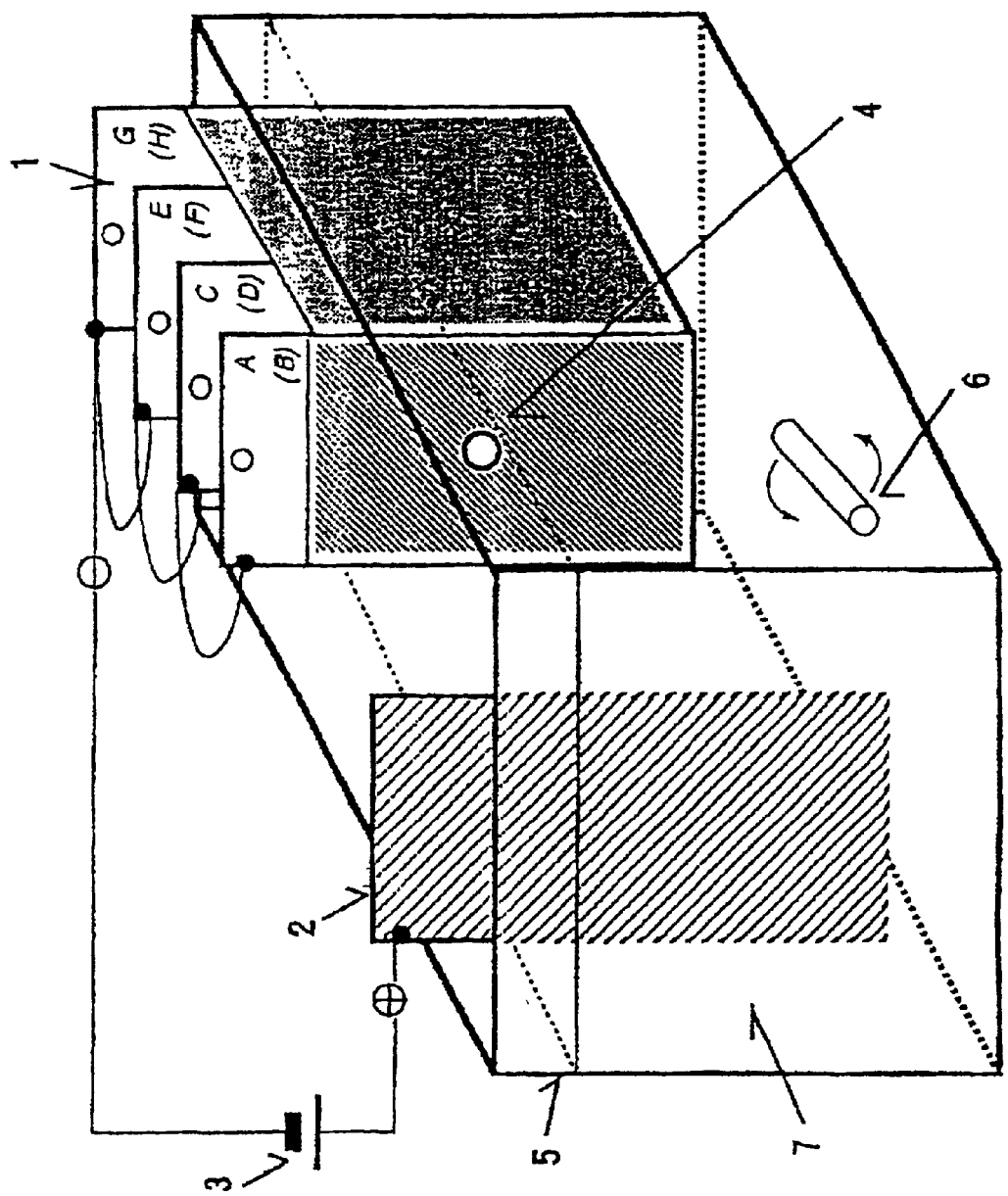
FIG. 1 is a schematic representation of a throwing power measuring apparatus by the four sheet box method.

1. Evaluation panel (alphabetic letter indicates evaluation face and each parenthesized alphabetic letter indicates the reverse side)
2. Counter electrode
3. Direct current source
4. Through hole
5. Electrodeposition coating vessel
6. Stirrer
7. Electrodeposition coating

DETAILED DESCRIPTION OF THE INVENTION

In the following, the present invention is described in detail.

In accordance with the present invention, the method of forming a coating film comprises applying the electrodeposition coating [1] on an article to be coated and then applying the electrodeposition coating [2] thereon followed by baking.

Electrodeposition Coating [1]

The above electrodeposition coating [1] comprises a sulfonium group-containing resin.

The above sulfonium group is a hydratable functional group in the above electrodeposition coating [1]. When given a voltage or current above a certain level in the process of electrodeposition coating, the sulfonium group is irreversibly converted to a nonconductor as a result of disappearance of the ionic groups by electrolytic reduction reaction on the electrode, as shown below.

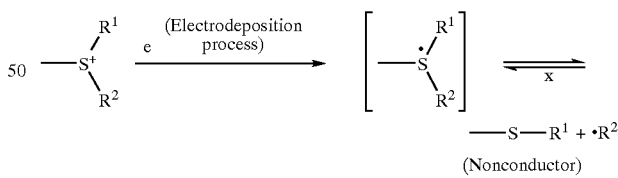

Therefore, during the process of electrodeposition, the coat already formed becomes insulating, and thus, after application of the electrodeposition coating [1], it is possible to apply the electrodeposition coating [2] without carrying out baking for curing or preheating.

Further, since the sulfonium group is irreversibly converted to a nonconductor, as mentioned above, it is possible to form a coat satisfactorily even on an uncoated site such as a bag-structured (inner panel) portion without increasing film thickness to an excessive extent on the outer panel site of a car body or the like even when the electrodeposition time is prolonged. Namely, with the prior art electrodeposition coatings free of any sulfonium group-containing resin, the film thickness on the outer panel site of a car body or the like increases to an excessive extent when the electrodeposition time is prolonged so as to attain a sufficient coat formation on the bag-structured (inner panel) portion. On the contrary, with the electrodeposition coating containing a sulfonium group-containing resin, the area of the coat formed is extended as the electrodeposition time is prolonged, without causing the film thickness to increase excessively.

This means that when the electrodeposition coating time is controlled, it is possible to form an electrodeposited coating film only on the outer panel portion of a car body or the like. This finding is utilized in the electrodeposition coating [1] used according to the present invention. Accordingly, without forming discontinuous portions as otherwise resulting from scattering of the coating on the interface between the outer panel portion and inner panel portion (bag-structured portion), good rust prevention and finish can be attained in this portion as well.

The property that can form a coat only on the desired portion without a coating to be scattered or forming a discontinuous portion with a very thin film thickness is referred to herein as "digital electrodepositability".

The digital electrodepositability required of the electrodeposition coating [1] in the practice of the invention is such that, when used in the electrodeposition coating of a coating with a resin solid matter of 20% by weight by the four sheet box method at 100 V and 40° C. for 120 seconds following a rise time of 5 seconds to provide a face A with a 20 to 30 μm film thickness, the coating gives to a face B with a film thickness of not more than one tenth of the film thickness on the above-mentioned face A.

The above-mentioned film thickness on the face A or the film thickness on the face B means the average film thickness after washing with water following electrodeposition coating and 25 minutes of curing by baking at 180° C.

According to the four sheet box method mentioned above, a box-like structure test panel is constructed using four steel panels with a hole in the direction of the counter electrode, as shown in FIG. 1, and coating is carried out under a certain condition. The throwing power is evaluated in terms of the film thickness ratios from face A to face G.

In accordance with the present invention, coating is carried out by using a coating with a resin solid matter of 20% by weight, adjusting the bath temperature at 40° C., raising the voltage up to 100 V in 5 seconds after the start of voltage application and thereafter maintaining the voltage of 100 V for 120 seconds.

If, when a 20 to 30 μm film thickness is provided on face A using the above electrodeposition coating [1] under such condition, the film thickness on face B is in excess of ¹/₁₀ relative to the above film thickness on face A, the digital electrodepositability is insufficient and, after application of the first stage cationic electrodeposition coating, the coating film may be thin or punctuate in the vicinity of the interface between the outer panel site and inner panel site of the article to be coated. A discontinuous layer will thus occur widely between the first stage coating film and the coating film subsequently obtained by applying the second stage cationic electrodeposition coating [2] thereonto and, as a result, rust prevention is lacked such that rusting or degradation may be liable to be occurred from such a discontinuous layer and appearance of the coating film is deteriorated. The film thickness ratio B/A is preferably not more than ¹/₁₂, more preferably ¹/₁₅.

In the practice of the invention, the above sulfonium group content is 5 to 400 mmol per 100 g of the resin solid matter of the above electrodeposition coating [1]. If it is less than 5 mmol/100 g, neither sufficient curability nor desired digital electrodepositability can be obtained, hence rust prevention or coating film appearance will be deteriorated and, further, the hydratability and bath stability will become poor. If it exceeds 400 mmol/100 g, the deposition of a coat on the surface of the article to be coated will become unsatisfactory. It is possible to select a more preferred content according to the resin skeleton. In the case of a novolak phenol-based epoxy resin or novolak cresol-based epoxy resin, for example, the content is preferably 5 to 250 mmol, more preferably 10 to 150 mmol, per 100 g of the solid matter of the resin composition.

The above sulfonium group-containing resin preferably has a number average molecular weight of 500 to 20,000. If the number average molecular weight is less than 500, coating efficiency in cationic electrodeposition coating will become poor and, if it exceeds 20,000, it will be no longer possible to form a good coat on the surface of the article to be coated. It is possible to select a more preferred number average molecular weight according to the resin skeleton. In the case of a novolak phenol-based epoxy resin or novolak cresol-based epoxy resin, for example, it is more preferably 700 to 5,000.

The above sulfonium group-containing resin preferably has a hydroxyl value of 2 to 120 mg KOH/g. If the value is less than the lower limit, no satisfactory curability will be manifested and, if it exceeds the upper limit, when used as a cationic electrodeposition coating, the coating film to be obtained will be poor in coating film physical characteristics such as corrosion prevention, or will show poor storage stability. It is more preferably 2 to 110 mg KOH/g, still more preferably 2 to 95 mg KOH/g.

The above sulfonium group-containing resin preferably has a glass transition temperature of −80 to 150° C. Resins having the above glass transition temperature lower than −80° C. are practically difficult to prepare. If it exceeds 150° C., the resulting coating film will be too low in flexibility and lack in chipping resistance. It is more preferably −70 to 100° C., still more preferably −50 to 80° C.

In cases where the electrodeposition coating [1] does not contain the resin (C1) having a number average molecular weight of 1,000 to 30,000, which is to be mentioned later herein, the glass transition temperature is preferably −80 to 80° C.

Although, in the present invention, the sulfonium group mentioned above greatly contributes to the above digital electrodepositability of the electrodeposition coating [1], it is also possible to adjust the digital electrodepositability, for example, by adding an additive such as a deposition modifier, adjusting the level of addition thereof, or controlling the conditions such as electrodeposition coating time and voltage, which are to be mentioned later herein.

The level of addition of the above deposition modifier may be 0.1 to 10% by weight relative to the solid matter in the electrodeposition coating [1].

The above sulfonium group-containing resin can be obtained by introducing a sulfonium group utilizing the functional group which the fundamental resin has, for example, there can be mentioned the method comprising introducing a sulfonium group into an epoxy group occurring within the molecule of the fundamental resin or an epoxy group introduced afterwards therein and the method comprising introducing a sulfonium group into an isocyanato group occurring within the molecule of the fundamental resin or an isocyanato group introduced afterwards therein.

As the method for introducing a sulfonium group into the epoxy group mentioned above, there maybe mentioned, for example, the method comprising reacting a sulfide/acid mixture with the epoxy group to thereby carry out sulfide introduction and sulfonium group formation and the method comprising first introducing a sulfide and then further converting the sulfide introduced to a sulfonium group with an acid or an alkyl halide, etc., if necessary followed by anion exchange. From the viewpoint of easy availability of starting reactants, the method which uses a sulfide/acid mixture is preferred.

As the method for introducing a sulfonium group into the isocyanato group mentioned above, there may be mentioned, for example, the method comprising introducing a sulfide by reacting with a monohydoxysulfide or the like and then introducing a sulfonium group by neutralizing or reacting with a monoepoxide.

The above sulfide is not particularly restricted but includes, for example, aliphatic sulfides, aliphatic-aromatic mixed sulfides, aralkyl sulfides and cyclic sulfides. More specifically, there may be mentioned, for example, diethyl sulfide, dipropyl sulfide, dibutyl sulfide, dihexyl sulfide, diphenyl sulfide, ethyl phenyl sulfide, tetramethylene sulfide, pentamethylene sulfide, thiodiethanol, thiodipropanol, thiodibutanol, 1-(2-hydroxyethylthio)-2-propanol, 1-(2-hydroxyethylthio)-2-butanol, 1-(2-hydroxyethylthio)-3-butoxy-1-propanol, and the like.

The acid mentioned above is not particularly restricted but includes, for example, formic acid, acetic acid, lactic acid, propionic acid, boric acid, butyric acid, dimethylolpropionic acid, hydrochloric acid, sulfuric acid, phosphoric acid, N-acetylglycine and N-acetyl-β-alanine, etc.

Generally, the mixing ratio between the above sulfide and the above acid in the above sulfide/acid mixture is preferably sulfide/acid=about 100/60 to 100/100 as expressed in mole ratio.

The alkyl halide mentioned above is not particularly restricted but includes, for example, methyl fluoride, methyl chloride, methyl bromide, methyl iodide, ethyl iodide, propyl iodide and isopropyl iodide, etc.

The above sulfonium group introduction reaction can be carried out, for example, by blending a mixture composed of a fundamental resin with an epoxy group introduced in the molecule thereof, the mixture of the above-mentioned sulfide in the specified amount corresponding to a sulfonium group content mentioned above and the above-mentioned acid as well as water in an amount 5 to 10 moles per mole of the sulfide employed, and stirring, in general, at 50 to 90° C. for several hours. The end point of the reaction may be indicated by a residual acid value of not more than 5. The sulfonium group introduction in the resin composition obtained can be confirmed by potentiometric titration method.

The reaction for converting a sulfide introduced to a sulfonium can be carried out accordingly in the same manner as mentioned above.

Resin (A)

The sulfonium group-containing resin in the above electrodeposition coating [1] is preferably a resin (A) which has at least one functional group selected from the group consisting of propargyl, carboxyl, epoxy, blocked isocyanato and hydroxyl groups and/or an unsaturated double bond. The electrodeposition coating [1] containing the above resin (A) can show digital electrodepositability owing to the sulfonium group, can show good reactivity and curability owing to the propargyl, carboxyl, epoxy, blocked isocyanato or hydroxyl group and/or the unsaturated double bond and can render coating films obtained excellent in strength and other coating film physical properties.

The above resin (A) may contain a sulfonium group as well as at least one functional group selected from the group consisting of propargyl, carboxyl, epoxy, blocked isocyanato and hydroxyl groups and/or an unsaturated double bond all in one molecule but that is not always necessary. For example, it may contain a sulfonium group and, one or two of at least one functional group or an unsaturated double bond as mentioned above in one molecule. In the latter case, the resin molecules as a whole constituting the resin composition contains these sulfonium groups and at least one functional group or an unsaturated double bond as mentioned above. Thus, the above resin (A) may generally be composed of a plurality of resin molecules having a sulfonium group as well as one, two, three or more of at least one functional group and/or an unsaturated double bond as mentioned above. When so referred to herein, the above resin (A) contains a sulfonium group and at least one functional group and/or an unsaturated double bond as mentioned above in the above sense.

Therefore, the above resin (A) may be one part of which contains, in one molecule, one or more of at least one functional group selected from the group consisting of propargyl, carboxyl, epoxy, blocked isocyanato and hydroxyl groups and/or an unsaturated double bond. From the curability viewpoint, however, a resin having at least two of them in one molecule is preferred.

The total content, in the above resin (A), of at least one functional group selected from the group consisting of propargyl, carboxyl, epoxy, blocked isocyanato and hydroxyl groups and/or an unsaturated double bond is preferably 80 to 450 mmol per 100 g of the resin solid matter in the above resin (A). If it is less than 80 mmol/100 g, no satisfactory curability will be manifested and, if it exceeds 450 mmol/100 g, when used as a cationic electrodeposition coating, coating film physical properties such as corrosion prevention of the coating film obtained will be poor and storage stability will be poor. A more preferred content can be selected according to the resin skeleton. In the case of a novolak phenol-based epoxy resin or novolak cresol-based epoxy resin, for instance, a content of 100 to 395 mmol per 100 g of the solid matter of the resin composition is more preferred.

The above resin (A) can be obtained by using a copolymerizable monomer having at least one functional group selected from the group consisting of propargyl, carboxyl, epoxy, blocked isocyanato and hydroxyl groups and/or an unsaturated double bond, and copolymerizing a monomer component containing such copolymerizable monomer, or by introducing such functional group and/or double bond into the fundamental resin in the conventional manner by a subsequent reaction.

Composition Containing Resin (A1) and Resin (C1)

In the practice of the invention, the above resin (A) is preferably a resin (A1) having a sulfonium group, an aliphatic hydrocarbon group of 8 to 24 carbon atoms, which may optionally contain an unsaturated double bond within the chain thereof, and a propargyl group. In this case, a resin (C1) having a number average molecular weight of 1,000 to 30,000 can be used in combination so that the electrodeposition coating [1] may have such performance characteristics as chipping resistance and flexibility, which have been required of conventional intermediate coating films.

Here, the resin (C1) is at least one member selected from the group consisting of polyester resins, polyether resins, polycarbonate resins, polyurethane resins, polyolefin resins, acrylic resins, and modifications of these.

In the above case, the resin (C1) forms a core and the resin (A1) forms a shell portion surrounding the core portion. Since the above-mentioned (C1) is structurally flexible, coating films excellent in shock resistance and chipping resistance can be obtained and, since it has a hydrophobic structure, it can form a core/shell structure with the resin (A1), so that a stable emulsion can be obtained.

The above resin (A1) can manifest a digital electrodepositability and further can be made excellent in reactivity and curability owing to the propargyl group and the unsaturated double bond optionally contained as well as can give coating films with excellent shock resistance owing to the aliphatic hydrocarbon group of 8 to 24 carbon atoms.

Thus, a composition containing the above resin (A1) and the above resin (C1) can give coating films having those characteristics required of conventional intermediate coating films, rendering the conventional intermediate coating unnecessary.

The above resin (A1) has, in the molecule thereof, a sulfonium group, an aliphatic hydrocarbon group of 8 to 24 carbon atoms, which may contain an unsaturated double bond within the chain thereof, and a propargyl group. Preferably, the above resin (A1) further has an epoxy resin skeleton. When the above resin (A1) has an epoxy resin skeleton, the strength and corrosion resistance of the coating films are improved.

The above epoxy resin is not particularly restricted but includes, for example, epibisepoxy resins, modifications thereof resulting from chain extension with a diol, dicarboxylic acid or diamine, etc.; epoxidized polybutadiene; novolak phenol-based polyepoxy resins; novolak cresol-based polyepoxy resins; polyglycidyl acrylate; polyglycidyl ethers derived from aliphatic polyols or polyether polyols; and polyglycidyl esters of polybasic carboxylic acids. Among these, novolak phenol-based polyepoxy resins, novolak cresol-based polyepoxy resins and polyglycidyl acrylate are preferred because of the ease of polyfunctionalization for increasing the curability. The above epoxy resins may partly comprise a monoepoxy resin.

When the above resin (A1) is such a resin having an epoxy resin skeleton as mentioned above, a sulfonium group, a propargyl group and an unsaturated double bond are introduced via an epoxy group of the epoxy resin which forms the above skeleton.

The above epoxy resin may partly have at least one epoxy group in one molecule. From the viewpoint of curability, however, it is preferably a polyepoxy resin having at least two epoxy groups in one molecule. As such, those polyepoxy resins specifically mentioned above and the like are preferably used.

When subjected, in the process of electrodeposition coating, to the electrolytic reduction reaction, such as mentioned above, the above sulfonium group loses its ionic group and irreversibly becomes a nonconductor. In this electrodeposition coating process, it is considered that an electrode reaction is induced and the sulfonium group holds the resulting hydroxide ion, whereby a base is electrolytically generated in the electrodeposited coat. This electrolytically generated base can convert the propargyl group, which occurs in the electrodeposited coat and is low in reactivity upon heating, to an allene linkage high in reactivity upon heating. Thus, the propargyl group, upon being converted to an allene linkage, can improve the reactivity and constitute a curing system. When it occurs in combination with a sulfonium group, it can further improve the throwing power of the resin composition for unknown reasons.

The content of the above propargyl group is 10 to 485 mmol per 100 g of the resin solid matter in the above resin (A1). When it is less than 10 mmol/100 g, no sufficient throwing power or curability can be manifested and, if it exceeds 485 mmol/100 g, the hydration stability may adversely be affected in the case used as a cationic electrodeposition coating. A preferred content can be selected according to the resin skeleton and, in the case of a novolak phenol-based epoxy resin or novolak cresol-based epoxy resin, for instance, it is preferably 20 to 375 mmol per 100 g of the solid matter in the resin composition.

The above-mentioned unsaturated double bond so referred to herein means a carbon-carbon double bond. The unsaturated double bond is highly reactive and, therefore, can further improve the curability.

The above aliphatic hydrocarbon group of 8 to 24 carbon atoms, which may optionally contain an unsaturated double bond within the chain thereof, is not particularly restricted but may be a straight-chained, branched or cyclic hydrocarbon group, for instance, other than aromatic hydrocarbon groups, and it may contain an unsaturated double bond within the chain thereof. It is preferably a straight or branched hydrocarbon group containing an unsaturated double bond within the chain thereof. Such a group can be introduced from a corresponding aliphatic hydrocarbon compound containing such group.

The unsaturated double bond content is 10 to 485 mmol per 100 g of the resin solid matter in the above resin (A1). If it is less than 10 mmol/100 g, no sufficient curability can be manifested and, if it exceeds 485 mmol/100 g, the hydration stability may adversely be affected in the case used as a cationic electrodeposition coating. A preferred content can be selected according to the resin skeleton and, in the case of a novolak phenol-based epoxy resin or novolak cresol-based epoxy resin, for instance, it is preferably 20 to 375 mmol per 100 g of the resin solid matter.

The unsaturated double bond content so referred to herein is expressed in terms of the amount corresponding to the epoxy group content into which the unsaturated double bond has been introduced. Thus, even when a molecule having a plurality of unsaturated double bonds within the molecule, such as a long-chain unsaturated fatty acid, has been introduced into the epoxy group, the unsaturated double bond content is expressed in terms of the content of the epoxy group into which the above-mentioned molecule having a plurality of unsaturated double bonds has been introduced. This is because even when a molecule having a plurality of unsaturated double bonds in the molecule thereof is introduced in one epoxy group, it is only one of the unsaturated double bonds that is thought to be substantially involved in the curing reaction.

The total content of the above sulfonium group, propargyl group and the unsaturated double bond is not more than 500 mmol per 100 g of the resin solid matter. If it exceeds 500 mmol, no resin will practically be obtained or no desired performance characteristics may be obtained. A preferred content can be selected according to the resin skeleton and, in the case of a novolak phenol-based epoxy resin or a novolak cresol-based epoxy resin, for instance, it is preferably not more than 400 mmol.

Further, the total content of the propargyl group and unsaturated double bond is preferably within the range of 80 to 450 mmol per 100 g of the resin solid matter. If it is less than 80 mmol, the curability may possibly be insufficient and, if it exceeds 450 mmol, the sulfonium group content decreases and the throwing power may possibly become insufficient. A preferred content can be selected according to the resin skeleton and, in the case of a novolak phenol-based epoxy resin or a novolak cresol-based epoxy resin, for instance, it is preferably 100 to 395 mmol.

A curing catalyst may be introduced into the above resin (A1). When a curing catalyst capable of forming an acetylide with a propargyl group, for instance, is used, it is possible to introduce the curing catalyst into the resin by converting part of the propargyl group into an acetylide.

The above resin (A1) can preferably be produced, for example, by the step (1) which comprises reacting an epoxy resin having at least two epoxy groups in one molecule with a compound having a functional group capable of reacting with the epoxy group as well as a propargyl group and a compound having a functional group capable of reacting with the epoxy group as well as an unsaturated double bond to obtain an epoxy resin compound containing the propargyl group and the unsaturated double bond and the step (2) which comprises introducing a sulfonium group into the residual epoxy group of the epoxy resin composition containing the propargyl group and the unsaturated bond obtained in the step (1).

As for the raw materials and reaction conditions to be used in obtaining the above resin (A1), those described in Japanese Kokai Publication 2000-38525 and Japanese Kokai Publication 2000-38527 can be employed. As the method of introduction of a sulfonium group, the above-mentioned method may be mentioned.

The above-mentioned resin (C1) is at least one resin selected from the group consisting of polyester resins, polyether resins, polycarbonate resins, polyurethane resins, polyolefin resins, acrylic resins, and modifications of these.

The above polyester resins, polyether resins, polycarbonate resins, polyurethane resins, polyolefin resins and acrylic resins are not particularly restricted but can be produced, for example, by copolymerizing those copolymerizable monomers which are in general use. Commercial products can also be utilized. Not only one species but also two or more species may be used.

The modifications mentioned above are not particularly restricted but may be any of those obtained by modifying the above mentioned polyester resin, polyether resin, polycarbonate resin, polyurethane resin, polyolefin resin and/or acrylic resin. As the method of modification, there may be mentioned, for example, the method comprising reacting with a compound having a functional group such as an isocyanato, carboxyl, epoxy or hydroxyl group within the molecule thereof or with a carbonate or the like.

In the practice of the invention, a resin having a functional group effectively reacting with the resin (A) is preferably used as the above resin (C1). The above functional group can contribute to improve reactivity with the resin (A) and in curability, to form firm coating films. It also contributes to improve corrosion prevention.

As the above functional group, there may be mentioned an unsaturated functional group as well as an isocyanato, carboxyl, epoxy, hydroxyl or carbonate group.

An unsaturated functional group is preferred as the above functional group. When the above resin (C1) has an unsaturated functional group, the resulting resin composition can be further improved in curability and corrosion prevention.

The source of introduction of the above unsaturated functional group is not particularly restricted but can be obtained, for example, by using a compound having an unsaturated functional group as a starting monomer for the resin (C1). Preferably, however, a polydiene derivative and/or a compound having an unsaturated triple bond is used.

The above polydiene derivative is not particularly restricted but polybutadiene derivatives are more preferred since the curability and corrosion prevention of the resin compound can be further improved, as mentioned above.

The above-mentioned compound having an unsaturated triple bond is not particularly restricted but may be any compound having a carbon-carbon triple bond. Propargyl alcohol and 2-butyne-1,4-diol are more preferred since they are particularly good in reactivity with the main resin and compatibility and can further improve the curability of the resulting resin composition.

The above unsaturated triple bond-containing compound can be used in an amount of 1 to 50% by weight relative to the weight of the solid matter in the resulting resin (C1). When the content of the source of introduction of the above unsaturated functional group relative to the weight of the solid matter in the resulting resin (C1) is less than 1% by weight, the effects of introduction thereof cannot be fully obtained and, when it exceeds 50% by weight, the hydrophilicity of the resin (C1) becomes excessive, so that the waterproof property of the coating films obtained will decrease and may lack corrosion prevention in some cases. Preferably, it is 5 to 50% by weight.

The above resin (C1) has a number average molecular weight of 1,000 to 35,000. When the number average molecular weight of the above resin (C1) is less than 1,000, coating efficiency in cationic electrodeposition coating becomes poor and, when it exceeds 35,000, it becomes difficult to form good coats on the surface of the article to be coated.

The above resin (C1) preferably has a glass transition temperature of −80 to 150° C. Those resins having the above mentioned glass transition temperature below −80° C. are practically difficult to prepare and, when it exceeds 150° C., the flexibility will become excessively low and the chipping resistance will be lacked. A more preferred range is −70 to 100° C., still more preferably −50 to 80° C.

The above resin (C1) preferably has a hydroxyl value of 2 to 120 mg KOH/g. If the above hydroxyl value is less than 2 mg KOH/g, the resin will lack in compatibility with the resin (A1) and the curability may decrease in some instances. If it exceeds 120 mg KOH/g, the hydrophilicity will become excessively high and the resin, when mixed with the resin (A1), will hardly form a core/shell structure, thus leading to decreased waterproof property of the coating film and corrosion prevention and rust prevention become insufficient in some instances. More preferably, it is 2 to 110 mg KOH/g, still more preferably 2 to 95 mg KOH/g.

The content of the above resin (C1) is preferably 5 to 80% by weight relative to the total resin solid matter of the above resin (C1) and the above resin (A1). If the content of the above resin (C1) is less than 5% by weight relative to the above-mentioned total resin solid matter, the effects of the resin composition of the invention, such as impact resistance and chipping resistance, may not be manifested sufficiently in some instances and, if it exceeds 80% by weight, the above resin (C1) and resin (A1) may undergo phase separation, rendering the resulting coating emulsion unstable. The content of the above resin (C1) relative to the above-mentioned total resin solid matter is more preferably 10 to 40% by weight.

In the practice of the invention, it is preferred that the above resin (C1) is at least one member selected from the group consisting of the following (C1-1) and (C1-2):
(C1-1) polyester polyols, polyether polyols, polycarbonate polyols, polyurethane polyols, polyolefin polyols and acrylic polymers;

(C1-2) polymers obtained by reaction of the above-mentioned (C1-1) with a compound having at least one functional group selected from the group consisting of isocyanato, carboxyl and epoxy groups within the molecule, a dialkyl carbonate, a cyclic carbonate, a monoalcohol, or a mixture of these.

The above polyester polyols include, for example, products obtained by reacting a polycarboxylic acid or an acid anhydride thereof with a polyol.

The above polycarboxylic acid or acid anhydride thereof is not particularly restricted but may be any compounds having at least two carboxyl groups and acid anhydrides thereof, for example saturated low-molecular aliphatic polycarboxylic acids such as succinic acid, adipic acid, sebacic acid, glutaric acid, azelaic acid, dodecanedicarboxylic acid and butanetricarboxylic acid; unsaturated low-molecular aliphatic polycarboxylic acids such as maleic acid, fumaric acid and itaconic acid; saturated or unsaturated long-chain polycarboxylic acids such as polybutadienedicarboxylic acid and IPU 22 (product of Okamura Seiyu); aromatic polycarboxylic acids such as isophthalic acid, terephthalic acid, trimellitic acid and pyromellitic acid; and acid anhydrides of these.

Among them, polybutadienedicarboxylic acid is preferred because of its excellent curability and hydrophobicity. Thus, for example, NISSO-PB C1000 (product of Nippon Soda), HYCAR CTB and HYCAR CTBN (both products of Ube Industries) can be used.

The polycarboxylic acids mentioned above can be used singly or in combination of two or more.

As an acid component other than the above polycarboxylic acid, there may be incorporated a low-molecular or high-molecular saturated or unsaturated monocarboxylic acid such as acetic acid, acrylic acid, methacrylic acid, crotonic acid, oleic acid, linolic acid, linseed oil or soybean oil, etc.

The polyol mentioned above is not particularly restricted but may be any polyol having at least two hydroxyl groups. There maybe mentioned, for example, saturated low-molecular polyols such as ethylene glycol, propylene glycol, 1,4-butanediol, 1,6-hexanediol, 3-methyl-pentanediol, neopentyl glycol, 1,4-cyclohexanediol, 1,4-cyclohexanedimethanol, trimethylolpropane and bisphenol A; unsaturated low-molecular polyols such as 2-butyne-1,4-diol, 2-butene-1,4-diol and hydrogenated bisphenol A; and unsaturated high-molecular polyols such as polybutadiene glycol and polyisoprene glycol.

Among them, polybutadiene glycol and 2-butyne-1,4-diol, which contain an unsaturated group, are preferred because of their excellent curability and hydrophobicity.

As the above polybutadiene glycol, there may be mentioned, for example, Poly bd R-45HT, Poly bd R-45M (both products of Idemitsu Petrochemcial), NISSO-PB G1000 and NISSO-PB G2000 (both products of Nippon Soda).

The above polyols can be used singly or in combination of two or more.

Also usable as the above polyester polyols are reaction products from a polycarboxylic acid and a polyepoxy compound. The above polycarboxylic acid includes those mentioned above.

The above polyepoxy compound is not particularly restricted but may be any compound having at least two epoxy groups. It thus includes, for example, epibisepoxy resins; modifications of the above epibisepoxy resins as resulting from chain extension using a diol, dithiol, dicarboxylic acid, diamine or the like, for example bisphenol A diglycidyl ether and Flep (product of Toray Thiokol), etc.; hydrogenated modifications of the above epibisepoxy resins or the above chain-extended epibisepoxy resins; terminal hydroxyl group-containing saturated or unsaturated aliphatic polyglycidyl ethers, for example hydroxyl group-terminated polybutadiene diglycidyl ethers such as Denarex R-45EPT (product of Idemitsu Petrochemical); and higher saturated or unsaturated polyglycidyl esters such as IPU 22G and SB-20G (products of Okamura Seiyu).

The above carboxylic acids, the above epoxy compounds and/or reaction products thereof may be used respectively singly or in combination of two or more.

As the above polyether polyols, there may be mentioned, for example, products obtained by ring opening polymerization of an alkylene oxide or a heterocyclic ether.

The above alkylene oxide is not particularly restricted but includes, for example, ethylene oxide, propylene oxide and butylene oxide, etc.

The above heterocyclic ether is not particularly restricted but includes, for example, cyclic acetals such as 1,3-dioxolane, etc.

The above-mentioned alkylene oxides and/or the above-mentioned heterocyclic ethers may be used respectively singly or in combination of two or more.

As such polyether polyols, there may be mentioned, for example, polyethylene glycol, polypropylene glycol, polyethylene-propylene random glycol, polytetramethylene ether glycol and the like. These may be used singly or in combination of two or more.

Also usable as the above polyether polyols are reaction products of a polyol with a polyepoxy compound. As the above polyol and the above polyepoxy compound, there may be mentioned those mentioned hereinabove.

As the above polycarbonate polyols, there may be mentioned, for example, products obtained by reacting a polyol with a polycarbonate such as an alkylene dicarbonate.

The above polycarbonate polyols are excellent in hydrolysis resistance and superior in water resistance to ordinary esters, hence can further improve the corrosion prevention of the resulting resin composition.

The above polycarbonate polyols are not particularly restricted but include, for example, polyhexamethylene carbonate diols and polyethylene carbonate diols.

The above polycarbonate polyols may be used singly or in combination of two or more.

The polyurethane polyols mentioned above include, for example, products obtained by reacting a polyol with a polyisocyanate compound. The above polyol includes those mentioned above.

The above polyurethane polyols are high in cohesive force and the urethane functional group is excellent in hydrolysis resistance, so that the workability and adhesiveness of the resulting resin composition can be further improved.

The above polyisocyanate compound is not particularly restricted but includes, for example, tolylene diisocyanate (TDI), diphenylmethanediisocyanate (MDI), p-phenylene diisocyanate, naphthalenediisocyanate, hexamethylene diisocyanate (HDI), 1,4-cyclohexanediisocyanate, 4,4'-dicyclohexylmethanediisocyanate, and modifications of these, such as urethanization products, carbodiimides, ureotines, dimmers and trimers, etc.

The above polyols and/or polyisocyanate compounds may be used singly or in combination of two or more.

The polyolefin polyols mentioned above include, for example, unsaturated high-molecular polyols such as, polybutadiene glycols and polyisoprene glycols specifically mentioned above referring to the polyols. The above polyolefin polyols are excellent in reactivity and hydrophobicity and can improve the curability and corrosion prevention of the resulting resin composition and, in addition, have a low SP property, so that the resistance to oil repellency of the resulting resin composition can further be improved.

Particularly preferred as the above polyolefin polyols are those having a polybutadiene derivative since they are particularly excellent in reactivity and hydrophobicity and the resulting resin composition will be very excellent in curability and corrosion prevention. Those having the polybutadiene derivative mentioned above are not particularly restricted but include, for example, the above-mentioned polybutadiene glycols.

The acrylic polymers mentioned above are obtained, for example, by copolymerizing (meth)acrylic acid and esters thereof or the like.

The above acrylic polymers are not particularly restricted but include, for example, homopolymers and copolymers of (meth) acrylic acid, methyl (meth)acrylate, etc. These may be used singly or in combination of two or more.

The production method of the above-mentioned (C1-1) can be carried out according to the conventional methods. The respective commercial products mentioned above can also be used. The above (C1-1) can be used singly or in combination of two or more.

The above (C1-2) are polymers obtained by reacting the above-mentioned (C1-1) with a compound having, within the molecule thereof, at least one functional group selected from the group consisting of isocyanato, carboxyl and epoxy groups, a dialkyl carbonate, a cyclic carbonate, a monoalcohol or a mixture of these.

The above isocyanato group-containing compound is not particularly restricted but includes, for example, those polyisocyanate compounds mentioned hereinabove as well as monoisocyante compounds such as hexyl isocyanate and phenyl isocyanate, for instance.

The carboxyl group-containing compound mentioned above is not particularly restricted but includes, for example, those saturated or unsaturated mono- or poly-carboxylic acids mentioned above.

The epoxy group-containing compound mentioned above is not particularly restricted but includes, for example, those polyepoxy compounds mentioned above as well as monoepoxy compounds such as phenyl glycidyl ether and glycidyl methacrylate, for instance.

The dialkyl carbonate mentioned above is not particularly restricted but includes, for example, dimethyl carbonate, diethyl carbonate, dipropyl carbonate and dibutyl carbonate, etc.

The cyclic carbonate mentioned above is not particularly restricted but includes, for example, ethylene carbonate and propylene carbonate, etc.

The monoalcohol mentioned above is not particularly restricted but includes, for example, saturated or unsaturated alcohols such as methanol, ethanol, allyl alcohol and propargyl alcohol, etc.

The reaction of the compounds mentioned above or a mixture thereof with the above-mentioned (C1-1) is not particularly restricted but may be carried out, for example, by dissolving the above compound and the above-mentioned (C1-1) in a solvent capable of dissolving both and stirring the mixture, if necessary with heating and with a catalyst and/or another additive admixed to allow the reaction to proceed.

As for the above-mentioned (C1-2), they may also be used as the resin (C1) in the practice of the invention in a state in which the starting material (C1-1) has not been reacted wholly but a portion of (C1-1) remains.

Particularly preferred as the above resin (C1) are polyolefin polyols, polyester polyols obtained by using polyolefindicarboxylic acids and/or polyurethane polyols, since they can give resin compositions excellent in curability and corrosion prevention owing to their having unsaturated bonds. The use of 2-butyne-1,4-diol as a monomer is also particularly preferred.

The method of preparing the electrodeposition coating [1] containing the above resin (A1) and resin (C1) is not particularly restricted but, for example, the method may be employed which comprises mixing up the above resin (A1) and the above resin (C1) at room temperature to 100° C., preferably 30 to 80° C., more preferably 40 to 60° C., for 30 minutes to 3.5 hours, then adding an additive(s) if necessary, and emulsifying in a high-speed rotary mixer.

In the electrodeposition coating [1] containing the above resin (A1) and resin (C1), it is not always necessary to use a curing agent, since the resin composition mentioned above itself has curability. However, for further improving the curability, such may be used. As such curing agent, there may be mentioned, for example, compounds having a plurality of at least one kind of propargyl groups and unsaturated double bonds, for example compounds obtained by subjecting a propargyl group-containing compound, such as propargyl alcohol, or an unsaturated double bond-containing compound, such as acrylic acid, to addition reaction to a polyepoxide such as novolak phenol or pentaerythritol tetraglycidyl ether.

Composition Containing Resin (A2)

In the practice of the invention, at least one resin (A2) selected from the group consisting of polyester resins, polyether resins, polycarbonate resins, polyurethane resins, polyolefin resins, acrylic resins and modifications of these is preferred as the above resin (A). In cases where the above resin (A2) does not have a propargyl group, it has no curability, so that it is necessary to contain a curing agent (B) composed of a melamine or a blocked isocyanate.

As these polyester resins, polyether resins, polycarbonate resins, polyurethane resins, polyolefin resins, acrylic resins, and modifications thereof, there may be mentioned those specifically mentioned hereinabove referring to the resin (C1). For these resins having a sulfonium group within the molecule, the sulfonium group can be introduced into these resins according to need.

The above sulfonium group introduction method includes the method mentioned hereinabove.

The above resin (A2) is structurally flexible and can give coating films excellent in shock resistance and chipping resistance, so that intermediate coating, which is conventional in the art, can be made unnecessary. The resin (A2), which contains a sulfonium group, shows digital electrodepositability and coats formed therefrom have insulating property, so that the electrodeposition coating [2] can be applied after application of the electrodeposition coating [1] without necessity of baking for curing or preheating.

The electrodeposition coating [1] containing the above resin (A2) contains, if desired, a curing agent (B) composed of a melamine or a blocked isocyanate.

The above curing agent (B) composed of a melamine or blocked isocyanate is highly hydrophobic, so that it forms a core/shell structure with the resin (A2) serving as the shell and the curing agent (B) as the core.

The above curing agent (B) composed of a melamine or blocked isocyanate is not particularly restricted but includes, for example, melamine type curing agents, blocked polyisocyanate compounds and the like.

The melamine type curing agents mentioned above are not particularly restricted but include, for example, melamine resins, benzoguanamine resins, glycoluryl resins, urea resins and the like. These may be used singly or two or more of them may be used in combination. Among them, melamine resins and benzoguanamine resins are generally used.

The above melamine resins may be converted to alkyl etherified melamine resins by alky etherification. Among them, methoxy group- and/or butoxy group-substituted melamine resins are preferred.

As the methoxy group- and/or butoxy group-substituted melamine resins, there may be mentioned one having a methoxy group singly such as Cymel 325, Cymel 327 and Cymel 370, mixed ones having methoxy group and butoxy group such as Cymel 202, Cymel 204, Cymel 232, Cymel 235, Cymel 236, Cymel 238, Cymel 254, Cymel 266 and Cymel 267 (all being trademarks, products of Mitsui Cytec) and ones having a butoxy group singly such as Mycoat 506 (trademark, product of Mitsui Cytec), U-Van 20N60 and U-Van 20SE (both being trademarks, products of Mitsui Chemical), etc. These may be used singly or two or more of them may be used in combination.

The above-mentioned benzoguanamine resins may also be used in the form substituted in the same manner.

The above-mentioned blocked polyisocyanate compounds are derived from the corresponding polyisocyanate compounds by blocking with a blocking agent.

The above polyisocyanate compounds are not particularly restricted but any compounds having at least two isocyanato groups in one molecule and include, for example, aliphatic diisocyanates such as hexamethylene diisocyanate (HMDI) and trimethylhexamethylene diisocyanate (TMDI); alicyclic diisocyanates such as isophoronediisocyanate (IPDI); araliphatic diisocyanates such as xylylene diisocyanate (XDI); aromatic diisocyanates such as tolylene diisocyanate (TDI) and 4,4-diphenylmethanediisocyanate (MDI); hydrogenated diisocyanates such as dimer acid diisocyanate (DDI), hydrogenated TDI (HTDI), hydrogenated XDI (H6XDI) and hydrogenated MDI (H12MDI); dimmers, trimers and higher-molecular-weight polyisocyanates derived from these diisocyanate compounds; adducts with a polyhydric alcohol, such as trimethylolpropane, water or a low-molecular-weight polyester resin; and so on. These may be used singly or two or more of them may be used in combination.

The above blocking agent is not particularly restricted but includes, for example, oximes such as methyl ethyl ketoxime, acetoxime, cyclohexanone oxime, acetophenone oxime and benzophenone oxime; phenols such as m-cresol and xylenol; alcohols such as methanol, ethanol, butanol, 2-ethylhexanol, cyclohexanol and ethylene glycol monoethyl ether; lactams such as ε-caprolactam; diketones such as diethyl malonate and acetoacetate esters; mercaptans such as thiophenol; ureas such as thiourea; imidazoles; carbamic acids, etc. These may be used singly or two or more of them may be used in combination.

The method of blocking the above polyisocyanate compounds with the above blocking agent is not particularly restricted. Thus, there may be mentioned, for example, the conventional method comprising carrying out the reaction until there is no more free isocyanato group remaining.

Usable as the blocked polyisocyanate compounds mentioned above are such commercial products as Desmodur series ones (Desmodur being a trademark, products of Sumitomo Bayer Urethane), Burnock D series ones (Burnock being a trademark, products of Dainippon Ink and Chemicals), Takenate B series ones (Takenate being a trademark, products of Takeda Chemical Industries), Coronate 2500 series ones (Coronate being a trademark, products of Nippon Polyurethane Industry) and the like. Among these, those blocked with an oxime, lactam or diketone are preferred.

The above curing agent is preferably incorporated in an amount such that the isocyanato group be contained in an amount not less than an equivalent to the above hydroxyl value relative to the hydroxyl value of the above resin (A2). Specifically, the above melamine type curing agents are incorporates such that the weight of the total resin (A2) mentioned above to the above melamine type curing agent is 8/2 to 5/5, preferably 7/3 to 6/4. In the case of polyisocyanate compounds, they are incorporated in a range of 0.8 to 1.5 equivalents relative to the above-mentioned hydroxyl value. If the amount is less than 0.8 equivalent relative to the above hydroxyl value, the coating curability will be insufficient, hence only soft and weak coating films will be obtained and not only the hardness but also the chemical resistance and stain resistance of the coating films will decrease. If it exceeds 1.5 equivalents, no further proportional effects of incorporation of the polyisocyanate compounds will be produced and, in addition, the strength, hardness, workability, chemical resistance and other characteristics of coating films will decrease and the yellowing resistance and weathering resistance tend to decrease. An amount of 1.0 to 1.2 equivalents is preferred.

Generally, a curing catalyst is used with the above curing agent (B).

When the above-mentioned melamine type curing agents are used, such curing catalysts as aromatic sulfonic acids such as dodecylbenzenesulfonic acid, dinonylnaphthalenesulfonic acid and p-toluenesulfonic acid; organic phosphonic acids such as aminotri(methylenephosphonic acid) and 1-hydroxyethylidene-1,1-diphosphonic acid; and amine salts of these may be used, for instance. These may be used singly or two or more of them may be used in combination.

The level of addition of the above curing catalysts is preferably 0.01 to 3.0% by weight relative to the total resin solid matter.

In cases where the above blocked polyisocyanates are used, the curing catalyst is not particularly restricted but includes, for example, organotin compounds such as dibutyltin laurate, dibutyltin octate and dibutyltin diacetate; and metal chelate compounds such as aluminum tris (acetylacetonate), titanium tetrakis(acetylacetonate), titanium bis(acetylacetonate), titanium bis(butoxy)bis (acetylacetonate), titanium bis(isopropoxy)bis (acetylacetonate), zirconium bis(butoxy)bis (acetylacetonate) and zirconium bis(isopropoxy)bis (acetylacetonate), etc. These may be used singly or two or more of them may be used in combination. Among them, organotin compounds are general.

Resin (A2-1)

Usable as the resin (A2) are resins (A2-1) obtained by reacting a polymer (a1) with a compound or a mixture (a2), and then reacting the resulting polymer (a3) with an epoxy resin (a4) followed by introducing a sulfonium group into the remaining epoxy resin, in which (a1) is at least one polymer selected from the group consisting of polyester polyols, polyether polyols, polycarbonate polyols, polyurethane polyols, polyolefin polyols and acrylic polymers, (a2) is a compound having at least one functional group selected from the group consisting of isocyanato, carboxyl and epoxy groups in the molecule, a dialkyl carbonate, a cyclic carbonate, a monoalochol or a mixture of these, (a3) is the polymer in which a carboxyl group is remained among polymers obtained by reacting (a1) with (a2), and (a4) has at least two epoxy groups in the molecule.

As the above polymer (a1) to be used in obtaining the above resin (A2-1), there maybe mentioned the above-mentioned (C1-1) As the polymer (a3) in which a carboxyl group is remained among polymers obtained by reacting the polymer (a1) with (a2), there may be mentioned those remaining carboxyl group-containing ones among the above-mentioned (C1-2).

As the above epoxy resin (a4) having at least two epoxy groups in the molecule, the above-mentioned polyepoxy resins and the like are preferably used. Preferred among them are those novolak phenol-based polyepoxy resins, novolak cresol-based epoxy resins and polyglycidyl acrylate which can be polyfunctionalized for increasing the curability.

The above epoxy resin having at least two epoxy groups in one molecule preferably has a number average molecular weight of 400 to 15,000, more preferably 650 to 12,000.

The reaction of the above (a3) with the above epoxy resin (a4) can be carried out according to the conventional manner.

For the above sulfonium group introduction method, there may be mentioned the method mentioned above.

Composition Containing Resin (A2-2)

The above resin (A2) may be a resin (A2-2) obtained by reacting a polymer (a5) with a compound or a mixture (a6), and then reacting the resulting polymer (a7) with a monohydroxy sulfide (a8) followed by neutralizing or reacting with a monoepoxide to thereby introduce a sulfonium group, in which (a5) is at least one polymer selected from the group consisting of polyester polyols, polyether polyols, polycarbonate polyols, polyurethane polyols, polyolefinpolyols and acrylic polymers, (a6) is a compound having at least one functional group selected from the group consisting of isocyanato, carboxyl and epoxy groups in the molecule, a dialkyl carbonate, a cyclic carbonate, a monoalochol or a mixture of these, and (a7) is a polymer in which an isocyanato group is remained among polymers obtained by reacting (a5) with (a6).

As the above polymer (a5) to be used in obtaining the above resin (A2-2), there maybe mentioned the above-mentioned (C1-1) As the polymer (a7) in which an isocyanato group is remained among the polymers obtained by reacting the polymer (a5) with (a6), there may be mentioned those remaining isocyanato group-containing ones among the above-mentioned (C1-2).

The above monohydroxy sulfide is not particularly restricted but includes, for example, 1-(2-hydroxyethylthio)-2-propanol, 1-(2-hydroxyethylthio)-2-butanol, 1-(2-hydroxyethylthio)-3-butoxy-1-propanol and the like.

For the above sulfonium group introduction method, there may be mentioned the method mentioned above.

Composition Containing Resin (A2-3)

The above resin (A2) may be a resin (A2-3) obtained by introducing a sulfonium group into part or all of the epoxy groups of an epoxidized polyolefin.

The above epoxidized polyolefin can be obtained, for example, by reacting a polyolefin polyol with epichlorohydrin.

The above polyolefin polyol is not particularly restricted but includes, for example, the above-mentioned polybutadiene glycols and polyisoprene glycols.

As the method for introducing a sulfonium group into part or all of the epoxy groups of the above epoxidized polyolefin, the above-mentioned method of sulfonium group introduction can be employed.

In the electrodeposition coating [1] to be used in the practice of the invention, the resin (A2) mentioned above may be used singly or two or more of them may be used in admixture. It is also possible to use a mixture of the resin (A2-1), resin (A2-2) and resin (A2-3) as the above resin (A2).

The electrodeposition coating [1], which comprises the above resin (A2) and, if desired, a melamine or blocked isocyanate-containing curing agent (B), may further contain a resin (C1) having a number average molecular weight of 1,000 to 30,000. The resin (C1) is at least one resin selected from the group consisting of polyester resins, polyether resins, polycarbonate resins, polyurethane resins, polyolefin resins, acrylic resins, and modifications of these.

When the above resin (C1) is used combinedly, the resin (C1) forms a core and the resin (A2) forms a shell portion surrounding the core portion. Since the above resin (C1) is structurally flexible, the electrodeposition coating [1] containing the resin (C1) can form coating films with further improved shock resistance and chipping resistance. Further, since it has a hydrophobic structure, the resin (C1) forms a core/shell structure with the resin (A2) to give a stable emulsion.

As the above resin (C1), those mentioned above may be mentioned and, as for the method of preparing the electrodeposition coating containing the resin (C1), the method mentioned above may be mentioned.

The above resin (C1) preferably is at least one member selected from the group consisting of the following (C1-1) and (C1-2):

(C1-1) polyester polyols, polyether polyols, polycarbonate polyols, polyurethane polyols, polyolefin polyols and acrylic polymers;

(C1-2) polymers obtained by reacting the above (C1-1) with a compound having at least one functional group selected from the group consisting of isocyanato, carboxyl and epoxy groups within the molecule, a dialkyl carbonate, a cyclic carbonate, a monoalcohol or a mixture of these.

As the above resins (C1-1) and (C1-2), too, those mentioned above may be mentioned.

Electrodeposition Coating [2]

In the practice of the present invention, the electrodeposition coating [2] has a time point at which the electric resistance value per unit volume of the deposited coat increases in the process of electrodeposition under a constant current condition.

Figure 2:
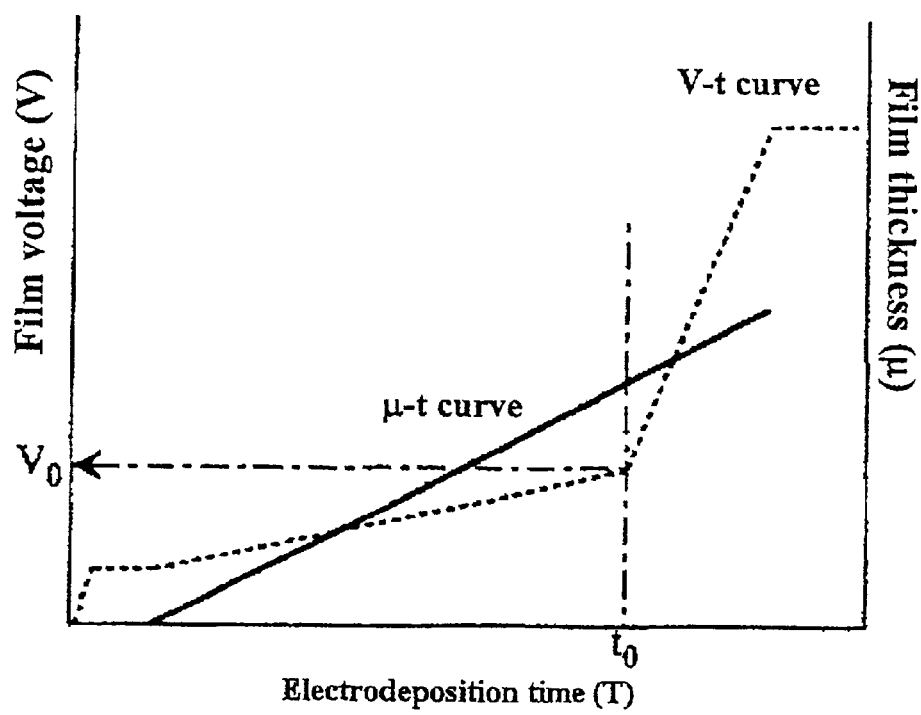
FIG. 2 is a graphic representation of the relation between the electrodeposition time and film voltage (V-t curve) and of the relation between the electrodeposition time and film thickness (μ-t curve), each under constant current conditions. The broken line curve is the V-t curve and the solid line curve is the μ-t curve.

Thus, the above electrodeposition coating [2] has a property such that when electrodeposition is carried out under constant current conditions (constant current method), the electric resistance value per unit volume of the deposited coat is constant value after the start of coat deposition as a result of voltage application and then changes at a time point and the electric resistance value per unit volume of the above deposited coat increases at that time point. Such an electrodeposition characteristic gives a V-t curve when expressed as the relationship between film voltage and electrodeposition time under constant current conditions, as schematically shown in FIG. 2. The above V-t curve shows a bending point at time $t_0$ and shows straight lines slanting toward the upper right in the time intervals before and after time $t_0$.

In the process of electrodeposition, the film voltage of the coat increases proportionally to the film thickness when the electric resistance value per unit volume of the coat is constant. In electrodeposition by the constant current method, the above film thickness increases proportionally to the time, as shown by the $\mu$-t curve in FIG. 2. Therefore, in the process of electrodeposition, the above film voltage increases proportionally to the time. Thus, when the relationship between film voltage and electrodeposition time under constant current conditions shows such a V-t curve as shown, this indicates that the electric resistance value per unit volume of the deposited coat changes before or after time $t_0$ and the electric resistance value per unit volume of the deposited coat after time $t_0$ increases as compared with the value before time $t_0$.

The above electrodeposition coating [2] to be used in accordance with the invention, when subjected to electrodeposition by the constant current method mentioned above, satisfies such conditions and the above-mentioned V-t curve shows a substantially constant inclination in each time interval before or after time $t_0$. The above time $t_0$ is a time point at which the above-mentioned electric resistance value per unit volume of the coat increases. Hereinafter in the present specification, this time $t_0$ at which the above electric resistance value per unit volume of the deposited coat increases is referred to as "point of change".

The above electric resistance value per unit volume of the coat can be calculated by the following formula:

$$R_1 = (V_1/I) \times S \times (1/\mu_1)$$

in the formula, $R_1$ is the electric resistance value per unit volume ($\Omega \cdot cm$) at time $t_1$ (sec), $V_1$ is the film voltage (V) at time $t_1$ (sec), I is the current (A), S is the area ($cm^2$) of the article to be coated and $\mu_1$ is the film thickness (cm) at time $t_1$ (sec) The resistance of the solution is neglected.

The magnitude of the current per unit area of the article to be coated in measuring the above electric resistance value per unit volume of the coat is selected within a range appropriate for observing the above-mentioned point of change, preferably within the range of 0.5 to 30 $mA/cm^2$. If it is less than 0.5 $mA/cm^2$, a longer period of time is required for the point of change to appear and, furthermore, the point of change may become indistinct. If it exceeds 30 $mA/cm^2$, the point of change appears instantaneously, which is not suited for observation. More preferably, it is 2 to 10 $mA/cm^2$.

The point of change to is not a value generally definable but a value varying depending on various factors. The above determining factors are, for example, such physical factors as the magnitude of applied current, the liquid temperature of the above electrodeposition coating [2] and the kind of articles to be coated; and such chemical factors in the above electrodeposition coating [2] as the concentration of the functional group releasing an ion upon voltage application and the presence or absence of an electrolytic reaction promoter. More specifically, the value of $t_0$ decreases as the magnitude of applied current mentioned above increases; the value of $t_0$ decreases as the liquid temperature of the above electrodeposition coating [2] lowers; as the kind of an article to be coated, one having a higher level of resistance gives a lower value of $t_0$. Further, the value of $t_0$ decreases with the decreasing concentration of the above functional group releasing an ion upon voltage application, as mentioned later in detail. Furthermore, when an electrolytic reaction promoter is added, the value of $t_0$ decreases.

For example, when a cold-rolled steel panel, with the surface thereof untreated, is used as an article to be coated in the practice of the invention and the constant current method is employed with magnitude of current of 0.5 to 30 $MA/cm^2$, the time until the point of change is observed is about 20 to 100 seconds.

As regards the electric resistance value per unit volume of the above coat, when, with the above electrodeposition coating [2] to be used in the practice of the invention, the electric resistance value just before the above point of change is compared with the electric resistance value at the time point after passing the above point of change but just before the breakage (rupture) of the coating film occurs, the electric resistance value just before the above rupture occurs preferably not less than 2 times of the value just before the above point of change. If it is less than 2 times, the throwing power will be insufficient and more preferably, not less than 5 times. Generally, the above time point just before the occurrence of rupture may be defined as the time point at which the film voltage has reached a certain value, for example 400 V.

The electrodeposition characteristics such as mentioned above can be manifested by using such electrodeposition coating [2] that contains a component having an ion-releasing functional group when a voltage is further applied to the deposited coat after coat deposition on the surface of the article to be coated mentioned above.

The above functional group releasing an ion upon the above voltage application is not particularly restricted but preferably is hydratable functional groups and among them, a sulfonium group is more preferred.

Since the above sulfonium group is irreversibly converted to a noncondutor, as described in detail referring to the above electrodeposition coating [1], the film thickness will not become excessive on the outer panel site of a car body or the like even when the electrodeposition time is prolonged, thus, a sufficient coat can be formed on the uncoated sites such as the bag-structured (inner panel) portion as well.

Thus, while, in the electrodeposition coating [1], such properties of the sulfonium group are utilized for securing the digital electrodepositability, those properties are utilized for obtaining high throwing power in the electrodeposition coating [2].

In the practice of the invention, as the above electrodeposition coating [2], it is preferred to use one contains a resin (A3) having a sulfonium group, an aliphatic hydrocarbon group of 8 to 24 carbon atoms, which may contain an unsaturated double bond within the chain thereof, and a propargyl group.

The above resin (A3) shows high throwing power and, further, can give coating films excellent in reactivity and curability owing to the propargyl group and the optionally contained unsaturated double bond as well as in shock resistance owing to the aliphatic hydrocarbon group of 8 to 24 carbon atoms.

In the practice of the invention, the outer panel is electrically isolated by the electrodeposited coating film formed from the electrodeposition coating [1] and, as a result, the throwing power of the electrodeposition coating [2] can further be reinforced. Therefore, the resin (A3) can provide a thin film having high rust prevention which is required by the bag-structured (inner panel) portion of a car body or the like article to be coated.

As the above resin (A3), there may be mentioned the resin (A1) mentioned above. Preferably, the above resin (A3) further has an epoxy resin skeleton. When the above resin (A3) has an epoxy resin skeleton, the strength and corrosion resistance of coating films are improved.

Further, as the above electrodeposition coating [2], one containing the above resin (A3) and the resin (C2) of a number average molecular weight of 1,000 to 30,000 can be used. In this case, a core/shell structure is formed and the shock resistance can further be improved.

Here, the above resin (C2) is at least one resin selected from the group consisting of polyester resins, polyether resins, polycarbonate resins, polyurethane resins, polyolefin resins, acrylic resins, and modification of these.

Preferably, the above resin (C2) is at least one member selected from the group consisting of the following (C2-1) and (C2-2):
(C2-1) polyester polyols, polyether polyols, polycarbonate polyols, polyurethane polyols, polyolefin polyols and acrylic polymers;
(C2-2) polymers obtained by reacting the above (C2-1) with a compound having at least one functional group selected from the group consisting of isocyanato, carboxyl and epoxy groups within the molecule, a dialkyl carbonate, a cyclic carbonate, a monoalcohol, or a mixture of these.

As the above resin (C2), the resin (C1) mentioned hereinabove may be mentioned.

In the electrodeposition coating [2], the above sulfonium group content is 5 to 400 mmol per 100 g of the resin solid matter in the above electrodeposition coating [2]. If it is less than 5 mmol/100 g, no sufficient throwing power or curability will be manifested and the hydratability and bath stability will become poor. If it exceeds 400 mmol/100 g, the coat deposition on the surface of the article to be coated will become poor. A preferred content can be selected according to the resin skeleton and, in the case of a novolak phenol-based epoxy resin or a novolak cresol-based epoxy resin, for instance, it is preferably 5 to 250 mmol, more preferably 10 to 150 mmol, per 100 g of the solid matter in the resin composition.

It is not always necessary to use a curing agent in the above electrodeposition coating [2], since the above-mentioned resin itself has curability. For further improving the curability, however, a curing agent may be used and such curing agent includes those mentioned hereinabove.

In the practice of the invention, a curing catalyst can be used in the above electrodeposition coating [1] and in the above electrodeposition coating [2] for promoting the curing reaction between unsaturated bonds. Such curing catalyst is not particularly restricted but includes, for example, metal acetates and/or acetylacetonate complexes. The above metal is not particularly restricted but includes, for example, copper, cerium, aluminum, tin, manganese, zinc, cobalt and nickel, and one or two or more of these may be used. Among them, the copper acetylacetone complex and copper acetate are preferred. The level of addition of the above curing catalyst is preferably 0.1 to 20 mmol per 100 g of the resin solid matter in the above electrodeposition coating [1] or of the resin solid matter in the above electrodeposition coating [2].

An amine may also be incorporated in the above electrodeposition coating [1] and in the above electrodeposition coating [2]. By the addition of the above amine, the conversion rate of the sulfonium group to a sulfide by electrolytic reduction in the process of electrodeposition is increased. The above amine is not particularly restricted but includes, for example, amine compounds such as primary to tertiary monofunctional or polyfunctional aliphatic amines, alicyclic amines and aromatic amines. Among these, water-soluble or water-dispersible ones are preferred and, thus, mention maybe made of, for example, alkylamines of 2 to 8 carbon atoms such as monomethylamine, dimethylamine, trimethylamine, triethylamine, propylamine, diisopropylamine and tributylamine; monoethanolamine, dimethanolamine, methylethanolamine, dimethylethanolamine, cyclohexylamine, morpholine, N-methylmorpholine, pyridine, pyrazine, piperidine, imidazoline, imidazole and the like. These may be used singly or two or more of them may be used in combination.

Among them, hydroxy amines such as monoethanolamine, diethanolamine and dimethylethanolamine are preferred because of their excellent water dispersion stability.

The above amine can be directly incorporated in the above electrodeposition coating [1] and in the above electrodeposition coating [2]. While, in the conventional neutralized type amine-containing electrodeposition coatings, the addition of a free amine results in deprivation of the neutralizing acid in the resin, hence the stability of the electrodeposition solution is markedly deteriorated, no such bath stability inhibition will occur in the practice of the invention.

The level of addition of the above amine is preferably 0.3 to 25 meq per 100 g of the resin solid matter in the above electrodeposition coating [1] or of the resin solid matter in the above electrodeposition coating [2]. If it is less than 0.3 meq/100 g, no sufficient effects can be obtained on the throwing power. If it exceeds 25 meq/100 g, the effects proportional to the addition level can no longer be obtained, thus this is not economical. More preferred is 1 to 15 meq/100 g.

The above electrodeposition coating [1] and the above electrodeposition coating [2] may contain, according to need, other components used in electrodeposition coatings in general. The other components mentioned above are not particularly restricted but include, for example, pigments, pigment dispersing resins, surfactants, antioxidants, ultraviolet absorbers and other additives for coatings.

The above-mentioned pigments are not particularly restricted but include, for example, color pigments such as titanium dioxide, carbon black and red iron oxide; rust-preventive pigments such as basic lead silicate and aluminum phosphomolybdate; extender pigments such as kaolin, clay and talc; and other pigments used in cationic electrodeposition coatings in general.

In the above electrodeposition coating [1], which is used in lieu of the conventional intermediate coating, the level of addition of the above pigments is preferably 10 to 50% by weight based on the solid matter. In the above electrodeposition coating [2], which is applied to the bag-structured portion of the article to be coated, hence generally is a clear coating, the level of addition of a pigment, if used, is preferably not more than 10% by weight based on the solid matter.

The pigment dispersing resins mentioned above are not particularly restricted but use can be made those pigment dispersing resins which are in general use. A pigment dispersing resin containing a sulfonium group and an unsaturated bond in the resin may also be used. Such pigment dispersing resin containing a sulfonium group and an unsaturated bond can be obtained, for example, by reacting a hydrophobic epoxy resin, which is obtained by reacting a bisphenol-based epoxy resin with a half-blocked isocyanate, with a sulfide compound or by reacting the above resin with a sulfide compound in the presence of a monobasic acid and a hydroxyl group-containing dibasic acid.

The above electrodeposition coating [1] and the above electrodeposition coating [2] can be obtained by admixing the above resin(s) with each component mentioned above as necessary and dissolving or dispersing the mixture in water. For use in cationic electrodeposition coating, they are preferably prepared to give a bath liquid with a nonvolatile matter of 10 to 30%. Further, the above electrodeposition coating [1] and the above electrodeposition coating [2] are prepared preferably in a manner such that the propargyl group, unsaturated double bond and sulfonium group contents therein be not out of the respective content ranges mentioned hereinabove referring to the respective resins.

Method of Forming a Coating Film

The method of forming a coating film according to the present invention comprises applying the above electrodeposition coating [1] on an article to be coated and then applying the electrodeposition coating [2], followed by baking.

Each application mentioned above is carried out in the manner of electrodeposition coating.

The above process of electrodeposition comprises (i) the step of immersing the article to be coated in the electrodeposition coating and (ii) the step of applying a voltage between the article to be coated mentioned above, which serves as a cathode, and the anode to thereby cause a coat to be deposited. On the occasion of electrodeposition coating with the electrodeposition coating [2], the process preferably comprises, in addition to the above-mentioned steps (i) and (ii), (iii) the step of further applying a voltage to the above deposited coat to thereby increase the electric resistance value per unit volume of the above coat.

The voltage application time may vary depending on the electrodeposition conditions. In coating with the electrodeposition coating [1], it is sufficient for the electrodeposited coating film to deposit the outer panel site of the article to be coated, so that the time may be 10 seconds to about 3 minutes, preferably 20 seconds to 2.5 minutes. In coating with the electrodeposition coating [2], it is necessary to form the coating film all over the inner panel site of the article to be coated, so that 2 to 4 minutes can be selected.

In carrying out the electrodeposition coating using the electrodeposition coating according to the method of forming a coating film of the invention, the article to be coated is not particularly restricted but may be any of those which have electric conductivity, for example iron, steel or aluminum panel, surface-treated modifications of these, molded products made thereof and the like. As the above molded articles, there may be mentioned bodies, parts and the like of cars, motorcycles and the like.

The above electrodeposition coating is generally carried out by applying a voltage of 50 to 450 V between the article to be coated to serve as a cathode and the anode. If the applied voltage is less than 50 V, insufficient electrodeposition will result. If it exceeds 450 V, the power consumption will increase and it is not economical. By using the electrodeposition coating according to the invention and applying a voltage within the above range, a uniform coat can be formed on the whole article to be coated without any steep film thickness increase during the process of electrodeposition.

In application of the electrodeposition coating [1], a voltage of about 50 to 200 V is preferred and, in application of the electrodeposition coating [2], 150 to 400 V is preferred.

In applying the above voltage, the bath liquid temperature of the above electrodeposition coating is generally and preferably 10 to 45° C.

In the above electrodeposition step (iii), a coat is to be caused to deposit on the site where no coat has been deposited of the above article to be coated. Thus, when, in the practice of the invention, a voltage is further applied in the electrodeposition step (iii), the electric resistance value per unit volume of the above coat increases owing to the electrodeposition characteristics of the above electrodeposition coating [2] which constitutes the above coat. As a result, it becomes possible to markedly improve the insulating property of the coat already formed in the process of electrodeposition and it becomes possible for the coat to acquire a sufficient insulating property without any excessive increase in film thickness and, at the time point that the electric resistance value per unit volume of the above coat increases, the electrodeposition on the relevant portion actually terminates. Then, immediately, coat deposition starts newly on that portion where no coat has been deposited of the article to be coated, and the above-mentioned process is repeated. As a result, it is possible to finally form a coat on all parts of the inner panel sites of the article to be coated. In this way, by going through the above electrodeposition step (iii) in applying the electrodeposition coating [2], it is possible to sharply increase the electric resistance value per unit volume of the coat and markedly improve the throwing power over the article to be coated.

In the method of forming a coating film according to the invention, the above electrodeposition coating [1] contains a sulfonium group and therefore the coating itself is highly insulating, as mentioned above, no baking is necessary after application of the above electrodeposition coating [1] and it is sufficient to carry out baking after application of the above electrodeposition coating [2]. According to the technologies described in Japanese Kokai Publication Hei-08-120494 and Japanese Kokai Publication Hei-10-8291, heating for curing or preheating is required between the first coating stage of the electrodeposition coating and the second coating stage of the electrodeposition coating and, therefore, not only the steps of heating and cooling but also necessary to control such temperature or time, which is troublesome since the heating temperature, heating time and other conditions in such heating for curing or preheating significantly influences the coating behavior, inclusive of the throwing power of the electrodeposition coating used in the subsequent second stage of coating. According to the method of forming a coating film of the present invention, such heating for curing or preheating is not necessary, so that, directly after application of the above electrodeposition coating [1], the article to be coated can be coated with the electrodeposition coating [2] by immersing the same therein. Thus, the above problems resulting from heating for curing or preheating can be solved, time and labor can be saved and the cost can be reduced.

However, the method of forming a coating film according to the invention does not entirely exclude the heating for curing or preheating after application of the above electrodeposition coating [1] and before application of the above electrodeposition coating [2] but the above-mentioned step of heating for curing or preheating may be carried out and the step of drying can be carried out. When heating for curing or preheating is carried out after application of the above electrodeposition coating [1], the insulating property of the coating film formed from the above electrodeposition coating [1] is increased, so that the throwing power is further improved in the step of coating with the above electrodeposition coating [2]. In cases where drying is carried out after application of the above electrodeposition coating [1], the drying may be made at room temperature to about 120° C. for 5 to 60 minutes.

The electrodeposited coat obtained after application of the above electrodeposition coating [2], either as it is after completion of the electrodeposition process or after washing with water, is cured by baking at 120 to 260° C., preferably 160 to 220° C., for 10 to 30 minutes, to finish coating.

In cases where heating for curing or preheating is carried out after application of the above electrodeposition coating [1], too, the above method of baking can be employed.

When the electrodeposition coating [1] and electrodeposition coating [2] in accordance with the method of forming a coating film according to the present invention is used, the electrodeposited coating film after curing preferably have a film thickness of 20 to 50 μm on the outer panel sites of articles to be coated such as car bodies, for instance, and a thickness of 5 to 25 μm on the inner panel sites thereof is preferred. If it is less than 20 μm on outer panel sites, the rust prevention, light degradation resistance, weathering resistance and chipping resistance will be poor. If it is less than 5 μm on inner panel sites, the rust prevention will be poor. Thicknesses exceeding 50 μm on outer panel sites and/or 25 μm on inner panel sites lead to waste of the coatings.

In particular with the above electrodeposition coating [2], the coat deposited on the surface of the article to be coated by electrodeposition is converted to a nonconductor by the electrolytic reduction reaction mentioned above and, as a result, the throwing power is markedly improved. Therefore, even when the film thickness of the coating films is within the above range, a uniform coating film can be formed all over the article to be coated and sufficient rust prevention can be manifested.

When the above electrodeposition coating [1] and the above electrodeposition coating [2] are used in combination and the process mentioned above is employed, the method of forming a coating film according to the invention shows the following excellent characteristics.

(1) Since the above electrodeposition coating [1] to be used in the method of forming a coating film according to the invention has digital electrodepositability, it can be applied selectively to outer panel sites of articles to be coated such as car bodies. As a result, in the vicinity of the interface between the outer panel site and inner panel site of an article to be coated, the film thickness of the coating film formed from the above electrodeposition coating [1] becomes almost zero and no wide discontinuous layer is formed with the coating film formed from the above electrodeposition coating [2]. Therefore, such troubles as rusting and degradation otherwise starting from such a discontinuous layer will not arise. Thus, not only excellent rust prevention is obtained but also a smooth and excellent finish appearance is shown since the coating film of the above electrodeposition coating [2] is formed directly from the above-mentioned vicinity of the interface on the inner panel site.

(2) The above electrodeposition coating [1] can be applied selectively to outer panel sites and the coating films obtained have a relatively low glass transition temperature and are high in tensile strength, elongation and flexibility and excellent in chipping resistance and adhesiveness.

(3) The above electrodeposition coating [1] gives coating films having those characteristics which are required of the intermediate coatings, such as excellent weathering resistance, light degradation resistance, smoothness and whiteness (hiding power). This makes intermediate coating unnecessary, so that the each step of the intermediate coating preparation, coating and drying become unnecessary and that intermediate coating booth requiring much cost and labor for control becomes unnecessary, too.

However, the method of forming a coating film according to the invention does not entirely exclude the intermediate coating but the intermediate coating may be applied. When the intermediate coating is applied, the chipping resistance and smoothness can be further improved. However, these features are already outstanding without applying any intermediate coatings and, when the coating cost, time, labor and other factors are taken into consideration, the advantages of applying the intermediate coating seem to be not significant.

(4) The above electrodeposition coating [2] is high in throwing power and can form coating films with a sufficient and uniform film thickness even on those inner panel sites of an article to be coated which have a complicated bag-like or other structure and are otherwise difficult to be coated. Such throwing power is more enhanced by insulating the coating films on outer panel sites formed from the above electrodeposition coating [1]. Thereby, it becomes possible to obtain, on inner panel sites, coating films excellent in barrier properties, rust prevention, corrosion prevention and adhesiveness. Since the above electrodeposition coating [2] is not deposited on outer panel sites, so that bag-structures can be coated efficiently and unnecessary increases in film thickness on outer panel sites can be prevented. The total amount of the coatings can thus be reduced.

(5) In accordance with the method of forming a coating film according to the invention, the omission of the steps of heating for curing or preheating and/or intermediate coating application and the formation of coating films excellent in characteristics as undercoating can be realized simultaneously, as mentioned above.

Generally, the article formed with the thus-obtained coating film is further subjected to top coating according to the purpose.

In the case of automotive outside panels, for instance, the above top coating is generally carried out by the two-coat one-bake technique which comprises applying a base coating and then applying a clear coating without curing the base coating, namely in the so-called wet-on-wet manner, and then baking both coating films simultaneously. On that occasion, using a water-borne coating as the above base coating and a powder coating as the above clear coating is preferred considering the possible environmental problems. Of course, it is also possible to employ a solid-based coating to which the one-coat coating technique is to be applied.

The coated articles having the coating films formed by the method of forming a coating film according to the present invention are excellent in rust prevention, weathering resistance, smoothness and chipping resistance on the outer panel sites thereof as evidenced in wet and dry testing and excellent in corrosion prevention such as wet rust prevention on inner panel sites and, furthermore, the rust prevention and finish on the interface are good.

The method of forming a coating film according to the invention, which is constituted as mentioned above, can cause the electrodeposition coating [1] to form a thick coating film having chipping resistance selectively on outer panel portions of articles to be coated and cause the electrodeposition coating [2] to form a coating film with a sufficient thickness on inner panel portions of the articles to be coated, even on the inner parts thereof, without the electrodeposition coating [1] intermingling in the vicinity of the interface between the outer panel portions and inner panel portions, thus, coating films excellent in chipping resistance, rust prevention, appearance and so forth can be obtained.

The method of forming a coating film according to the invention, which is constituted as mentioned above, can give excellent coating films without performing heating for curing or preheating between coating with the electrodeposition coating [1] and coating with the electrodeposition coating [2], hence makes the steps of heating and cooling for the heating for curing or preheating and the troublesome temperature control unnecessary.

Furthermore, the method of forming a coating film according to the invention, which is constituted as mentioned above, can give coating films provided with those properties which are required of intermediate coatings, such as chipping resistance, accelerated weathering resistance, light degradation resistance, rust prevention and smoothness, and thus makes coating with an intermediate coating unnecessary, which is generally required and, the respective steps of intermediate coating preparation, coating and drying and the intermediate coating booth requiring much cost and labor in controlling the same become unnecessary.

The method of forming a coating film according to the invention thus gives coating films excellent in both physical properties and appearance, realizes resources saving, labor saving and cost reduction, and is suited for use in coating car bodies, in particular.

EXAMPLES

The following examples illustrate the present invention in more detail. They are, however, by no means limitative of the scope of the present invention.

Production Example 1

Production of a Polyester Polyol Resin (C1-1a)

Polybutadienedicarboxylic acid (NISSO PB-C1000, product of Nippon Soda; 660 g) and 60 g of 2-butyne-1,4-diol (product of BASF) were dissolved in 145 g of xylene, and 0.7 g of p-toluenesulfonic acid was added. The condensation reaction was allowed to proceed while dehydrating at 150° C.

After formation of the theoretical amount of water, the solvent was removed under reduced pressure to give a polyester polyol resin with a number average molecular weight of 6,070, a glass transition temperature of –21.1° C. and a hydroxyl value of 18.5.

Production Example 2

Production of a Polyester Polyol Resin (C1-1b)

Polybutadienedicarboxylic acid (trademark: NISSO PB-C1000, product of Nippon Soda; 580 g), 75.6 g of hydrogenated bisphenol A (trademark: Rikabinol HB, product of Shinnippon Rika) and 26 g of 2-butyne-1,4-diol (product of BASF) were dissolved in 116 g of methyl isobutyl ketone, 0.58 g of p-toluenesulfonic acid and 0.34 g of methoquinone were added, and the condensation reaction was allowed to proceed while dehydrating under reflux at 100 to 160° C. for 8 hours.

After formation of the theoretical amount of water, the solvent was removed under reduced pressure to give a polyester polyol resin with a number average molecular weight of 4,900, a glass transition temperature of –14.0 ° C. and a hydroxyl value of 22.0.

Production Example 3

Production of a Polyurethane Polyol Resin (C1-1c)

Polybutadienediol (trademark: NISSO PB-G2000, product of Nippon Soda; 200 g) and 11.6 g of diphenylmethanediisocyanate (MDI) were dissolved in 24 g of dehydrated methyl isobutyl ketone, and the mixture was heated and stirred at 60 to 70° C. for 4.5 hours, whereby a polyurethane polyol resin with a number average molecular weight of 7,000, a glass transition temperature of 10.0° C. and a hydroxyl value of 16.0 was obtained.

Production Example 4

Production of a Polyolefin Polyol Resin (C1-1d)

Polybutadienediol (trademark: NISSO PB-G2000, product of Nippon Soda, number average molecular weight 1,930) was prepared.

Production Example 5

Production of a Resin (A-1) Constituted of Novolak Epoxy-propargyl Alcohol-linseed Oil-sulfonium To 3,082.5 g of a cresol novolak-based epoxy resin with an epoxy equivalent of 201.8 (trademark: Epo Tohto YDCM-703, product of Tohto Kasei) placed in a separable flask equipped with a stirrer, thermometer, nitrogen inlet tube and condenser were added 621.3 g of propargyl alcohol, 535.4 g of linseed oil fatty acid and 9.2 g of dimethylbenzylamine as a catalyst, and the mixture was heated to 110° C. and the reaction was allowed to proceed for 2 hours. When the epoxy equivalent amounted to 1,850, 311.6 g of 1-(2-hydroxyethylthio)-2-propanol, 110 g of glacial acetic acid and 329.9 g of deionized water were added and the reaction was allowed to proceed at 75° C. for 6 hours. After confirming that the residual acid value was less than 5, 1,501.2 g of deionized water was added to give the desired resin composition solution.

Production Example 6

Production of a Resin (A-2) Constituted of Epoxidized Polybutadiene-propargyl Alcohol-sulfonium Propargyl alcohol (729.3 g) and 9.2 g of dimethylbenzylamine as a reaction catalyst were added to 4,500 g of an epoxidized polybutadiene resin (trademark: E-1000-6.5, epoxy equivalent 250, product of Nisseki Mitsubishi) in a separable flask equipped with a stirrer, thermometer, nitrogen inlet tube and condenser. The temperature was raised to 110° C. and the reaction was allowed to proceed for 4 hours. When the epoxy equivalent amounted to 1,850, 311.6 g of 1-(2-hydroxyethylthio)-2-propanol, 110 g of glacial acetic acid and 329.9 g of deionized water were added, and the reaction was allowed to proceed at 75° C. for 8 hours. After confirming that the residual acid value was not more than 5, 2,688 g of deionized water was added to give the desired resin composition.

Preparation Example 1

Preparation of an Electrodeposition Coating [1-1]

The resin (C1-1a) obtained in Production Example 1 (110 g) was mixed with 720 g of the resin (A-1) obtained in Production Example 5, and 1.8 g of aluminum-acetonate complex (Al(acac)$_3$) as an additive and 0.66 g of methoxyquinone as antioxidant were added, and the mixture was emulsified by adding 1,700 g of deionized water (DIW). To the emulsion obtained were added 1.8 g of cerium acetate (Ce(OAc)$_3$) and 1.2 g of copper acetate (Cu(OAc)$_2$), and the mixture was stirred at 55° C. for 3 hours to give an electrodeposition coating [1-1].

Preparation Example 2

Preparation of an Electrodeposition Coating [1-2]

An electrodeposition coating [1-2] was obtained in the same manner as in Preparation Example 1 except that the resin (C1-1b) obtained in Production Example 2 was used in lieu of the resin (C1-1a).

Preparation Example 3

Preparation of an Electrodeposition Coating [1-3]

An electrodeposition coating [1-3] was obtained in the same manner as in Preparation Example 1 except that the resin (C1-1c) obtained in Production Example 3 was used in lieu of the resin (C1-1a).

Preparation Example 4

Preparation of an Electrodeposition Coating [1-4]

An electrodeposition coating [1-4] was obtained in the same manner as in Preparation Example 1 except that the resin (C1-1d) obtained in Production Example 4 was used in lieu of the resin (C1-1a).

Preparation Example 5

Preparation of an Electrodeposition Coating [1-5]

An electrodeposition coating [1-5] was obtained in the same manner as in Preparation Example 1 except that the resin (A-2) obtained in Production Example 6 was used in lieu of the resin (A-1).

Preparation Example 6

Preparation of an Electrodeposition Coating [1-6]

An electrodeposition coating [1-6] was obtained in the same manner as in Preparation Example 1 except that the resin (C1-1a) was not used.

Preparation Example 7

Preparation of an Electrodeposition Coating [1-7]

An electrodeposition coating [1-7] was obtained in the same manner as in Preparation Example 5 except that the resin (C1-1a) was not used.

Preparation Example 8

Preparation of an Electrodeposition Coating [2]

To 789 g of the resin (A-1) obtained in Production Example 5 were added 1.8 g of aluminum-acetonate complex (Al(acac)$_3$) as an additive and 0.66 g of methoxyquinone as antioxidant, and the mixture was emulsified by adding 1,700 g of DIW. To the emulsion obtained were added 1.8 g of cerium acetate (Ce(OAc)$_3$) and 1.2 g of copper acetate (Cu(OAc)$_2$), and the mixture was stirred at 55° C. for 3 hours to give a coating. To this coating was further added 0.2 g of N-methylethanolamine to give an electrodeposition coating [2].

Reference Example 1

Throwing Power Examination

The electrodeposition coatings [1-1] to [1-7] and [2] as obtained in Preparation Examples 1 to 8 were evaluated for throwing power using the four sheet box throwing power measuring apparatus shown in FIG. 1, as follows. The results are shown in Table 1.

Reference Example 1-1

Throwing Power Examination of the Electrodeposition Coating [1-1] Obtained in Preparation Example 1

Four liters (4 L) of the above electrodeposition coating [1-1] was placed in an plastics-made vessel (100×250×200 mm) for electrodeposition coating as shown in FIG. 1 and stirred with a magnetic stirrer. A box-like structure with evaluation panels was constructed using four zinc phosphate-treated steel panels (JIS G 3141 SPCC-SD, treated with Surfdyne SD-5000), placing them at 20-mm intervals and providing each of the first to third panels from the counter electrode with a hole with a diameter of 8 mm so that the coating could enter through that hole alone. The box structure was placed in the above electrodeposition coating vessel with a distance of 150 mm to the counter electrode. The side portions of the box-like structure with evaluation panels were treated for electrical isolation so that no coat could be formed on those side portions. Coating was carried out by applying a voltage between the above evaluation panel serving as the cathode and the counter electrode. Coating was conducted by using a coating bath with a resin solid matter of 20% by weight, adjusting the bath temperature at 40° C., increasing the voltage to 100 V in 5 seconds from the start of voltage application and maintaining the voltage at 100 V for the succeeding 120 seconds.

The evaluation panels after coating were washed with water, then baked at 180° C. for 20 minutes and air-cooled, and coating films obtained were measured for film thickness of each face from the evaluation panel face A, closest to the counter electrode to the evaluation panel face G, remotest from the counter electrode, thereby the throwing power was examined.

Reference Examples 1-2 to 1-7

Throwing Power Examination of the Electrodeposition Coatings [1-2] to [1-7] Obtained in Preparation Examples 2 to 7

The electrodeposition coatings [1-2] to [1-7] obtained in Preparation Examples 2 to 7 were examined for throwing power in the same manner as in Reference Example 1-1 except that they were used respectively in lieu of the electrodeposition coating [1-1].

Reference Example 1-8

Throwing Power Examination of the Electrodeposition Coating [2] Obtained in Preparation Example 8

The above electrodeposition coating [2] was placed in the above electrodeposition coating vessel and evaluated for throwing power in the same manner as in Reference Example 1-1 except that coating was carried out by using a coating having a resin solid matter of 20% by weight, adjusting the bath temperature to 30° C. and raising the voltage to 240 V in 5 seconds from the start of voltage application and then maintaining the voltage of 240 V for the subsequent 175 seconds.

Results of Reference Example 1

The results shown in Table 1 indicate that when the above electrodeposition coatings [1-1] to [1-7] were used, the face A film thickness was within the range of 20 to 35 µm and the face B film thickness was not more than ¹/₁₀ of the face A film thickness in each case, the faces C to G remaining almost uncoated. The results shown in Table 1 also show that when the above electrodeposition coating [2] was used, almost the same film thickness was maintained on each of the faces A to G, indicating the high throwing power of the composition.

Reference Example 2

Measurement of the Contact Angle of a Coating Film with Water

The coating films obtained on the evaluation panels face A in Reference Example 1 by using the electrodeposition coatings [1-1] to [1-7] and [2] obtained in Preparation Examples 1 to 8 were measured for the contact angle with water using an automatic water contact angle meter (trademark: Face Contact-Angle Meter model CA-A, product of Kyowa Kaimen Kagaku), as follows.

Each evaluation panel having the face A was placed on a sample stand with the face A facing upward. A water drop having a diameter of 20 μm was formed on the tip of a microsyringe, the sample stand was moved vertically upward and the water drop was transferred onto the face A. From the moment of water drop transfer, the time was measured and, after the lapse of 60 seconds, the angle between the tangent line passing the point of contact of the water drop surface with the coated panel and the face A was read, and the value read was reported as the contact angle with water. The results are shown in Table 1.

TABLE 1

| Electro-deposition coating | Applied voltage (V) | Coating temperature (° C.) | Time[1] | Film Thickness (μm) | | | | | | | Water contact angle (degrees) |
|---|---|---|---|---|---|---|---|---|---|---|---|
| | | | | A | B | C | D | E | F | G | |
| [1-1] | 100 | 40 | 5/120 | 27 | 5* | 3* | 0 | 0 | 0 | 0 | 88.8 |
| [1-2] | | | | 26 | 5* | 4* | 0 | 0 | 0 | 0 | 84.4 |
| [1-3] | | | | 29 | 3* | 2* | 0 | 0 | 0 | 0 | 80.4 |
| [1-4] | | | | 33 | 3* | 3* | 0 | 0 | 0 | 0 | 89.2 |
| [1-5] | | | | 34 | 4* | 4* | 0 | 0 | 0 | 0 | 89.7 |
| [1-6] | | | | 27 | 3* | 2* | 0 | 0 | 0 | 0 | 80.9 |
| [1-7] | | | | 32 | 3* | 2* | 0 | 0 | 0 | 0 | 87.9 |
| [2] | 240 | 30 | 5/175 | 15 | 14 | 14 | 15 | 15 | 16 | 16 | 69.0 |

[1]The time indicates the time of voltage raising (seconds)/time of voltage maintenance (seconds).
*Deposition found only around the hole for throwing power evaluation.
The mean value for the whole surface is almost 0 μm.

Reference Example 3

Measurement of the Electric Resistance Value of a Coating Film

A cold-rolled, surface-untreated steel panel as an evaluation panel was immersed in the electrodeposition coating [2] obtained in Preparation Example 8, and a constant current of 5.0 mA/cm$^2$ was applied between the panel and a counter electrode. As a result, an abrupt change occurred in the film voltage of the evaluation panel. Based on the film voltage and film thickness at a time point ($t_0$) just before this abrupt change occurred and those at a time point ($t_1$) at which the film voltage reached 400 V, the electric resistance values ($R_0$ and $R_1$) were calculated and the rate of increase was determined. As a result, the ratio of increase in electric resistance value per unit volume of the coat deposited from the electrodeposition coating [2] was 5.6 times.

Example 1

Using the four sheet box throwing power measuring apparatus used in Reference Example 1, two-stage electrodeposition coating was carried out in the following manner.

(1) First Stage Electrodeposition

Four liters (4 L) of the electrodeposition coating [1-1] obtained in Preparation Example 1 was placed in the above electrodeposition coating vessel, and a electrodeposition coating film was allowed to deposit by carrying out the electrodeposition in the same manner as in Reference Example 1-1 at 100 V and 40° C. for 2 minutes. The evaluation panels after coating were thoroughly washed with water, further washed with pure water and air-dried at room temperature for 40 minutes.

(2) Second Stage Electrodeposition

Then, the evaluation panels obtained in the above manner were set up in the above electrodeposition coating vessel containing 4 L of the electrodeposition coating [2] obtained in Preparation Example 8 and an electrodeposition coating film was allowed to deposit by carrying out electrodeposition in the same manner as in Reference Example 1-8 at 240 V and 30° C. for 3 minutes. The evaluation panels after coating were thoroughly washed with water, further washed with pure water and air-dried at room temperature for 40 minutes. Thereafter, they were baked at 180° C. for 25 minutes to give cured coating films.

Examples 2 to 7

Cured coating films were obtained in the same manner as in Example 1 except that the electrodeposition coatings obtained in the Preparation Examples were used as specified in Table 2 in lieu of the electrodeposition coating [1-1].

Comparative Example 1

Coating Film Formation Using a Prior Art Cationic Electrodeposition Coating Without Preheating (1) Production of a Prior Art Cationic Electrodeposition Coating (a)

A cationic electrodeposition coating was obtained according to Preparation Example 1 described in Japanese Kokai Publication Hei-10-8291. This is referred to as "prior art cationic electrodeposition coating (a)".

(2) Production of a Prior Art Cationic Electrodeposition Coating (b)

A cationic electrodeposition coating was obtained according to Preparation Example 2 described in Japanese Kokai Publication Hei-10-8291. This is referred to as "prior art cationic electrodeposition coating (b)".

(3) Application of the Prior Art Cationic Electrodeposition Coatings (a) and (b)

Cured coating films were obtained by carrying out electrodeposition coating in the same manner as in the above Example 1 except that the prior art cationic electrodeposition coatings (a) and (b) obtained in the above manner were used in lieu of the electrodeposition coatings [1-1] and [2], respectively.

Comparative Example 2

Coating Film Formation Using a Prior Art Cationic Electrodeposition Coating with Preheating Cured coating films were obtained by carrying out electrodeposition coating in the same manner as in Comparative Example 1 except that preheating was carried out at 170° C. for 20 minutes between the first stage electrodeposition and the second stage electrodeposition.
Evaluations The coating films obtained in Examples 1 to 7 and Comparative Examples 1 and 2 were each evaluated in the following manner. The results of Evaluation 1 and Evaluation 2 are shown in Table 2 and the results of Evaluations 3 to 6 are shown in Table 3.
Evaluation 1 Throwing Power The faces A to G were each measured for film thickness.

The results shown in Table 2 indicate that the face A was coated particularly thick and the faces C to G were coated substantially uniform and sufficiently thick in all the Examples but that, in each of Comparative Examples 1 and 2, the film thickness decreased toward the face G and thus the throwing powder was inferior.

Evaluation 2 Contact Angle with Water

The faces A, E and G were each evaluated for contact angle (°) with water by the same method as used in Reference Example 2.

When, for the coating films obtained in Example 1, the results shown in Table 2 are compared with the contact angles with water as shown in Table 1, the water contact angle of face A is approximate to the water contact angle obtained in Reference Example 2 using the electrodeposition coating [1-1] obtained in Preparation Example 1, and the water contact angles of face E and face G are respectively approximate to the water contact angles obtained in Reference Example 2 using the electrodeposition coating [2] obtained in Preparation Example 8. It is thus indicated that the face A was selectively coated with the above electrodeposition coating [1-1] and the faces E and G were each coated with the above electrodeposition coating [2].

For the coating films obtained in Examples 2 to 7 as well, comparison of the results shown in Table 2 with the water contact angles shown in Table 1 indicates that the face A was selectively coated with the corresponding electrodeposition coating [1] and both the faces E and G were coated with the corresponding electrodeposition coating [2].

Evaluation 3 Chipping Resistance Test

The face A was used as the test piece. Crushed stone was mounted on a gravelometer tester so that the crushed stone might collide with the test piece at an angle of 45°, and the chipping resistance test was carried out under the following conditions:
Crushed stone: No. 7
Crushed stone weight: 50 g
Ejecting pressure: 4 kg/cm$^2$
Test piece temperature: 25° C. and −20° C.

Thereafter, the condition of the coating film on the test piece was evaluated by visual observation. The following evaluation criteria were used:
○: No peeling of the coating film is observed.
Δ: Slight peeling of the coating film is observed.
×: Severe peeling of the coating film is observed.

The results shown in Table 3 indicate that, when methods of forming a coating film according to Examples were used, the chipping resistance was always better as compared with that of Comparative Examples 1 and 2.

Evaluation 4 Accelerated Weathering Resistance Test

The face A was used as the test piece and measured for gloss value at 60 degrees before testing. Then, 500 hours of testing in a sun shine weather-o-meter (product of Suga Shikenki) was carried out and then the gloss value was again measured at 60 degrees. The percent of retention of gloss at 60 degrees was calculated for evaluation from the values before and after testing, as follows:

(60-degree gloss retention percentage)=[(60-degree gloss value after testing)/(60-degree gloss value before testing)]×100

The following evaluation criteria were used:
○: Exceeds 90%
Δ: 50 to 90%
×: Less than 50%

The results shown in Table 3 indicate that when methods of forming a coating film according to Examples were used, the accelerated weathering resistance was always better as compared with the cases where the method of Comparative Example 1 or 2 was used.

TABLE 2

| | | Electro-deposition coating [1] | Electro-deposition coating [2] | | Face | | | | | | |
|---|---|---|---|---|---|---|---|---|---|---|---|
| | | | | | A | B | C | D | E | F | G |
| Example | 1 | [1-1] | [2] | Coating film (μm) | 31.5 | 21.0 | 16.5 | 18.5 | 18.1 | 14.7 | 15.7 |
| | | | | Water contact angle (degrees) | 88.1 | — | — | — | 70.0 | — | 72.0 |
| | 2 | [1-2] | | Coating film (μm) | 30.8 | 20.8 | 19.8 | 18.4 | 18.3 | 15.0 | 15.5 |
| | | | | Water contact angle (degrees) | 83.9 | — | — | — | 71.0 | — | 70.0 |
| | 3 | [1-3] | | Coating film (μm) | 33.1 | 19.9 | 19.1 | 17.4 | 17.8 | 14.9 | 15.2 |
| | | | | Water contact angle (degrees) | 80.2 | — | — | — | 73.0 | — | 71.0 |
| | 4 | [1-4] | | Coating film (μm) | 35.0 | 24.0 | 23.3 | 16.9 | 17.4 | 15.4 | 15.6 |
| | | | | Water contact angle (degrees) | 89.0 | — | — | — | 75.0 | — | 70.0 |
| | 5 | [1-5] | | Coating film (μm) | 35.5 | 21.9 | 22.2 | 17.9 | 17.7 | 15.5 | 15.1 |
| | | | | Water contact angle (degrees) | 89.2 | — | — | — | 75.0 | — | 73.0 |
| | 6 | [1-6] | | Coating film (μm) | 31.5 | 20.9 | 19.8 | 17.8 | 17.1 | 15.0 | 15.4 |
| | | | | Water contact angle (degrees) | 79.9 | — | — | — | 72.0 | — | 72.0 |
| | 7 | [1-7] | | Coating film (μm) | 33.3 | 20.6 | 18.9 | 18.2 | 18.0 | 16.5 | 16.3 |
| | | | | Water contact angle (degrees) | 85.6 | — | — | — | 72.0 | — | 73.0 |
| Compar. Ex. | 1 | Conventional type (a) (No preheating) | Conventional type (b) | Coating film (μm) | 38.0 | 30.4 | 29.9 | 18.3 | 18.6 | 8.0 | 7.1 |
| | | | | Water contact angle (degrees) | 69.0 | — | — | — | 68.0 | — | 69.0 |
| | 2 | Conventional type (a) (Preheating made) | Conventional type (b) | Coating film (μm) | 34.9 | 27.0 | 25.9 | 19.3 | 19.0 | 11.8 | 12.0 |
| | | | | Water contact angle (degrees) | 67.0 | — | — | — | 67.0 | — | 69.0 |

Evaluation 5 Rust Prevention

According to JIS Z 2371, a 5% aqueous solution of sodium chloride was sprayed at 35° C. for 960 hours. Then, an attempt was made to peel off the cross-cut portion using an adhesive tape and the one-side peeled width from the cut portion was measured. The evaluation was made according to the following criteria:

◎: Less than 1.5 mm
○: 1.5 to 2.0 mm
×: Exceeds 2.0 mm

The results shown in Table 3 indicate that when methods of forming a coating film according to Examples were used, the rust prevention was always superior as compared with the cases where the method of Comparative Example 1 or 2 was used.

Evaluation 6 Smoothness

The coating film surfaces obtained were evaluated for smoothness by visual observation. The following evaluation criteria were used:

◎: Very good
○: Good
×: Poor

The results shown in Table 3 indicate that when methods of forming a coating film according to Examples were used, the smoothness was always superior to the cases where the method of Comparative Example 1 or 2 was used.

TABLE 3

| | Chipping resistance | Accelerated weathering resistance | Rust prevention Face A | Face E | Face G | Smoothness |
|---|---|---|---|---|---|---|
| Example | | | | | | |
| 1 | Δ | Δ | ◎ | ○ | ○ | ◎ |
| 2 | ○ | Δ | ◎ | ○ | ○ | ◎ |
| 3 | ○ | Δ | ◎ | ○ | ○ | ○ |
| 4 | ○ | Δ | ◎ | ◎ | ○ | ○ |
| 5 | Δ | ○ | ○ | ○ | ○ | ◎ |
| 6 | ○ | Δ | ○ | ○ | ○ | ○ |
| 7 | ○ | ○ | ○ | ○ | ○ | ○ |
| Compar. Ex. | | | | | | |
| 1 | X | X | ○ | X | X | X |
| 2 | X | X | ◎ | ○ | ○ | ○ |

Based on the above evaluation results, it was established that the method of forming a coating film according to the invention can cause the electrodeposition coating [1] to selectively deposit on the face A to a sufficient film thickness and, as for the faces B to G, the method makes it possible to maintain a sufficient and almost uniform film thickness until the face G, thus the composition shows high throwing power. On the other hand, it was found that, according to the methods of Comparative Examples 1 and 2, the film thickness decreases as the distance from the anode increases and thus poor throwing power results. Further, in accordance with the method of forming a coating film according to the invention, coating films superior in chipping resistance, accelerated weathering resistance, rust prevention and smoothness to the coating films obtained by the methods of Comparative Examples 1 and 2.

What is claimed is:

1. A method of forming a coating film which comprises, sequentially, process steps of applying an electrodeposition coating [1] to an article to be coated, a driving process step, and process steps of applying an electrodeposition coating [2] thereon, followed by a baking process step, wherein said process steps of applying the electrodeposition coating [1] comprise (i) a step of immersing the article to be coated in the electrodeposition coating and (ii) a step of applying a voltage between the article to be coated and the anode, said process steps of applying the electrodeposition coating [2] thereon comprise (i) a step of immersing the article to be coated in the electrodeposition coating, (ii) a step of applying a voltage higher than the voltage applied in step [1] (ii) between the article to be coated and the anode, said electrodeposition coating [1] containing a sulfonium group-containing resin, giving a film thickness to a face B of the article to be coated of not more than one tenth of the film thickness of a face A of the article when used in the electrodeposition coating of a coating with a resin solid matter of 20% by weight by a four sheet box method at 100 V and 40° C. for 120 seconds following a rise time of 5 seconds to provide the face A with a 20 to 30 μm film thickness, and said electrodeposition coating [2] having a time point at which the electric resistance value per unit volume of a deposited coat increases in the process of electrodeposition under a constant current condition.

2. The method of forming a coating film according to claim 1, wherein the sulfonium group-containing resin in the electrodeposition coating [1] is a resin (A) having at least one functional group selected from the group consisting of propargyl, carboxyl, epoxy, blocked isocyanate and hydroxyl groups and/or an unsaturated double bond.

3. The method of forming a coating film according to claim 2, wherein the resin (A) is a resin (A1) having a sulfonium group, an aliphatic hydrocarbon group of 8 to 24 carbon atoms, which optionally contains an unsaturated double bond within the chain thereof, and a propargyl group.

4. The method of forming a coating film according to claim 3, wherein the resin (A1) has an epoxy resin skeleton.

5. The method of forming a coating film according to claim 4, wherein the electrodeposition coating [1] contains a resin (C1) having a number average molecular weight of 1,000 to 30,200, and said resin (C1) is at least one member selected from the group consisting of polyester resins, polyether resins, polycarbonate resins, polyurethane resins, polyolefin resins, and acrylic resins.

6. The method of forming a coating film according to claim 3, wherein the electrodeposition coating [1] contains a resin (C1) having a number average molecular weight of 1,000 to 30,000, and said resin (C1) is at least one member selected from the group consisting of polyester resin, polyether resins, polycarbonate resins, polyurethane resins, polyolefin resins and acrylic resins.

7. The method of forming a coating film according to claim 2, wherein the electrodeposition coating [1] contains a resin (C1) having a number average molecular weight of 1,000 to 30,000, and said resin (C1) is at least one member selected from the group consisting of polyester resins, polyether resins, polycarbonate resins, polyurethane resins, polyolefin resins, and acrylic resins.

8. The method of forming a coating film to claim 2, wherein the resin (A) is at least one resin (A2) selected from the group consisting of polyester resins, polyether resins, polycarbonate resins, polyurethane resins, polyolefin resins, and acrylic resins.

9. The method of forming a coating film according to claim 2, wherein the electrodeposition coating [1] and the electrodeposition coating [2] each contains a metal acetate and/or an acetylacetonate complex as a catalyst, and said metal is at least one member selected from the group consisting of copper, cerium, aluminum, tin, manganese, zinc, cobalt and nickel.

10. The method of forming a coating film according to claim 1, wherein the resin (A) is at least one resin (A2) selected from the group consisting of polyester resins, polyether resins, polycarbonate resins, polyurethane resins, polyolefin resins, and acrylic resins.

11. The method of forming a coating film according to claim 10, wherein the resin (A2) does not have a propargyl group but the electrodeposition coating [1] contains a curing agent (B) composed of a melamine or a blocked isocyanate.

12. The method of forming a coating film according to claim 10, wherein the electrodeposition coating [1] and the electrodeposition coating [2] each contains a metal acetate and/or an acetylacetonate complex as a catalyst, and said metal is a least one member selected from the group consisting of copper, cerium, aluminum, tin, manganese, zinc, cobalt and nickel.

13. The method of forming a coating film according to claim 1, wherein the electrodeposition coating [2] contains a resin (A3) having a sulfonium group, an aliphatic hydrocarbon group of 8 to 24 carbon atoms, which optionally contains an unsaturated double bond within the chain thereof, and a propargyl group.

14. The method of forming a coating film according to claim 13, wherein the resin (A3) has an epoxy resin skeleton.

15. The method of forming a coating film according to claim 14, wherein the electrodeposition coating [2] contains a resin (C2) having a number average molecular weight of 1,000 to 30,000 and said resin (C2) is at least one member selected from the group consisting of polyester resins, polyether resins, polycarbonate resins, polyurethane resins, polyolefin resins, and acrylic resins.

16. The method of forming a coating film according to claim 13, wherein the electrodeposition coating [2] contains a resin (C2) having a number average molecular weight of 1,000 to 30,000, and said resin (C2) is at least one member selected from the group consisting of polyester resins, polyether resins, polycarbonate resins, polyurethane resins, polyolefin resins, and acrylic resins.

17. The method of forming a coating film according to claim 1, wherein the electrodeposition coating [1] and the electrodeposition coating [2] each contains a metal acetate and/or an acetylacetonate complex as a catalyst, and said metal is at least one member selected from the group consisting of copper, cerium, aluminum, tin, manganese, zinc, cobalt and nickel.

18. The method of forming a coating film according to claim 1, wherein the step (i) of the process of electrodeposition coating [1] is carried out by applying a voltage of 50 to 200 V and for the time to apply of 10 seconds to 3 minutes.

19. The method of forming a coating film according to claim 1, wherein the step (i) of the process of electrodeposition coating [2] is carried out by applying a voltage of 150 to 400 V and for the time to apply of 2 minutes to 3 minutes.

* * * * *

UNITED STATES PATENT AND TRADEMARK OFFICE
CERTIFICATE OF CORRECTION

PATENT NO.     : 6,790,329 B2
DATED          : September 14, 2004
INVENTOR(S)    : Hiroyuki Sakamoto It is certified that error appears in the above-identified patent and that said Letters Patent is hereby corrected as shown below:

Column 37, line 65 through Column 38, line 29,
Claim 1, should read as follows:
    1. A method of forming a coating film
    which comprises, sequentially, process steps of applying an electrodeposition coating [1] to an article to be coated, a drying process step, and process steps of applying an electrodeposition coating [2] thereon, followed by a baking process step, wherein said process steps of applying the electrodeposition coating [1] comprise (i) a step of immersing the article to be coated in the electrodeposition coating and (ii) a step of applying a voltage between the article to be coated and the anode, said process steps of applying the electrodeposition coating [2] thereon comprise (i) a step of immersing the article to be coated in the electrodeposition coating, (ii) a step of applying a voltage higher than the voltage applied in step [1](ii) between the article to be coated and the anode, said electrodeposition coating [1] containing a sulfonium group-containing resin,
    giving a film thickness to a face B of the article to be coated of not more than one tenth of the film thickness of a face A of the article when used in the electrodeposition coating of a coating with a resin solid matter of 20% by weight by a four sheet box method at 100 V and 40 C° for 120 seconds following a rise time of 5 seconds to provide the face A with a 20 to 30 ÿm film thickness, and said electrodeposition coating [2] having a time point at which the electric resistance value per unit volume of a deposited coat increases in the process of electrodeposition under a constant current condition.

UNITED STATES PATENT AND TRADEMARK OFFICE
CERTIFICATE OF CORRECTION

PATENT NO. : 6,790,329 B2
DATED : September 14, 2004
INVENTOR(S) : Hiroyuki Sakamoto It is certified that error appears in the above-identified patent and that said Letters Patent is hereby corrected as shown below:

<u>Column 40,</u>
Lines 4 through 12, claim 15 should read as follows:
    15. The method of forming a coating film according to Claim 4,
    wherein the electrodeposition coating [1] contains a resin (C1) having a number average molecular weight of 1,000 to 30,000, and said resin (C1) is at least one member selected from the group consisting of polyester resins, polycarbonate resins, polyurethane resins, polyolefin resins, and acrylic resins.

Signed and Sealed this

Twelfth Day of April, 2005

JON W. DUDAS
*Director of the United States Patent and Trademark Office*